US011620710B2

(12) United States Patent
Ramanathan et al.

(10) Patent No.: US 11,620,710 B2
(45) Date of Patent: Apr. 4, 2023

(54) SYSTEMS AND METHODS FOR QUANTUM BASED OPTIMIZATION OF AN EFFICIENT FRONTIER DETERMINATION

(71) Applicant: Wells Fargo Bank, N.A., San Francisco, CA (US)

(72) Inventors: Ramanathan Ramanathan, San Francisco, CA (US); Andrew J. Garner, IV, State Road, NC (US); Abhijit Rao, Irvine, CA (US); Pierre Arbadjian, Matthews, NC (US); Michael Erik Meinholz, Charlotte, NC (US); Ramesh Yarlagadda, Charlotte, NC (US); Bradford A. Shea, Mint Hill, NC (US); Adam Sanders, Huntersville, NC (US); William E. Goff, New York, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/887,305

(22) Filed: May 29, 2020

(65) Prior Publication Data

US 2021/0374862 A1 Dec. 2, 2021

(51) Int. Cl.
*G06Q 40/06* (2012.01)
*G06N 10/00* (2022.01)
*G06Q 10/04* (2012.01)

(52) U.S. Cl.
CPC ............. *G06Q 40/06* (2013.01); *G06N 10/00* (2019.01); *G06Q 10/04* (2013.01)

(58) Field of Classification Search
CPC ...................................................... G06Q 40/06
See application file for complete search history.

(56) References Cited

U.S. PATENT DOCUMENTS

| | | | |
|---|---|---|---|
| 2005/0187846 A1* | 8/2005 | Subbu ................ | G06Q 40/06 |
| 2005/0187849 A1* | 8/2005 | Bollapragada ......... | G06Q 40/06 |
| | | | 705/36 R |
| 2008/0243716 A1* | 10/2008 | Ouimet ................ | G06Q 40/06 |
| 2015/0026095 A1* | 1/2015 | Ohana ................ | G06Q 40/06 |
| 2015/0206246 A1* | 7/2015 | Lange ................ | G06Q 40/06 |
| 2016/0110812 A1* | 4/2016 | Mun ................ | G06Q 40/06 |

OTHER PUBLICATIONS

Orus, et al., in "Quantum computing for finance: Overview and prospects," from Review in Physics, 2019 (Year: 2019).*

* cited by examiner

*Primary Examiner* — Olabode Akintola
*Assistant Examiner* — Brandon M Duck
(74) *Attorney, Agent, or Firm* — Womble Bond Dickinson (US) LLP

(57) ABSTRACT

Various systems and methods are provided for quantum computing based optimization of an efficient frontier determination. One exemplary method may comprise identifying one or more filtered portfolio optimization factor data based on one or more portfolio optimization factor data, QC algorithms, and algorithm performance information, selecting one QC algorithm for each filtered portfolio optimization factor data of the one or more filtered portfolio optimization factor data, and utilizing the selected QC algorithm to optimize an efficient frontier determination for each identified filtered portfolio optimization factor data.

20 Claims, 8 Drawing Sheets

SYSTEMS AND METHODS FOR QUANTUM BASED OPTIMIZATION OF AN EFFICIENT FRONTIER DETERMINATION

TECHNOLOGICAL FIELD

Example embodiments of the present disclosure relate generally to optimization and, more particularly, to systems and methods for quantum algorithm-based optimization.

BACKGROUND

Although still in its infancy, quantum computing and its boundless potential applications are of rapidly increasing interest to a broad array of industrial sectors, including simulation, artificial intelligence, healthcare, and financial services. Unlike classical computers, which process information in bits that can only represent one of two binary information states at a time, quantum computers process information in quantum bits (qubits) that can represent a coherent superposition of both binary information states at the same time. Further, two or more qubits may be entangled so that their physical properties are correlated even when separated by large distances, and quantum computers may simultaneously perform a vast number of operations on these entangled qubits. This massive parallelism allows quantum computers to perform incredibly complex calculations at speeds unimaginable today and solve certain classes of problems that are beyond the capability of today's most powerful supercomputers.

Reflecting this broad potential impact, companies from a variety of market sectors are investing substantial resources to develop these promising quantum computing theories into real-world quantum computing capabilities.

BRIEF SUMMARY

Computing systems, computing apparatuses, computer-implemented methods, and computer program products are disclosed herein for using quantum computing (QC) to optimize performance.

In some embodiments, a system may be provided for QC based optimization of an efficient frontier determination, the system comprising: QC optimization factor filtering circuitry configured to identify one or more filtered portfolio optimization factor data based on one or more of portfolio optimization factor data related to a portfolio, QC algorithms, and algorithm performance information; algorithm selection circuitry configured to select one QC algorithm for each filtered portfolio optimization factor data of the one or more filtered portfolio optimization factor data; and QC optimization circuitry configured to utilize the selected QC algorithm to optimize an efficient frontier determination for each identified filtered portfolio optimization factor data.

In some embodiments, the system further comprises processing circuitry configured to rebalance a portfolio based on the efficient frontier determination.

In some embodiments, the system further comprises input-output circuitry configured to provide a portfolio owner with a rebalancing alert based on the efficient frontier determination.

In some embodiments, the system further comprises processing circuitry configured to, after receiving input from the portfolio owner, rebalance a portfolio associated with the portfolio owner based on the efficient frontier determination.

In some embodiments, the algorithm selection circuitry is further configured to receive a catalog of QC algorithms and associated algorithm performance information.

In some embodiments, the portfolio optimization factor data comprises one or more of personal portfolio constraints data representing customer-defined constraints.

In some embodiments, the portfolio optimization factor data comprises one or more of personal portfolio factor data representing a customer-defined personal preference.

In some embodiments, a method is provided for quantum computing based optimization of an efficient frontier determination, the method comprising: identifying one or more filtered portfolio optimization factor data based on one or more portfolio optimization factor data, QC algorithms, and algorithm performance information; selecting one QC algorithm for each filtered portfolio optimization factor data of the one or more filtered portfolio optimization factor data; and utilizing the selected QC algorithm to optimize an efficient frontier determination for each identified filtered portfolio optimization factor data.

In some embodiments, the method further comprises rebalancing a portfolio based on the efficient frontier determination.

In some embodiments, the method further comprises providing a portfolio owner with a rebalancing alert based on the efficient frontier determination.

In some embodiments, the method further comprises, after receiving input from the portfolio owner, rebalancing a portfolio associated with the portfolio owner based on the efficient frontier determination.

In some embodiments, the method further comprising receiving a catalog of QC algorithms and associated algorithm performance information.

In some embodiments, the portfolio optimization factor data comprises one or more of personal portfolio constraints data representing customer-defined constraints.

In some embodiments, the portfolio optimization factor data comprises one or more of personal portfolio factor data representing a customer-defined personal preference.

In some embodiments, a computer program product is provided for QC based optimization of an efficient frontier determination, the computer program product comprising at least one non-transitory computer-readable storage medium storing program instructions that, when executed, cause a system to: identify one or more filtered portfolio optimization factor data based on one or more portfolio optimization factor data, QC algorithms, and algorithm performance information; select one QC algorithm for each filtered portfolio optimization factor data of the one or more filtered portfolio optimization factor data; and utilize the selected QC algorithm to optimize an efficient frontier determination for each identified filtered portfolio optimization factor data.

In some embodiments, the program instructions, when executed, further cause the system to rebalance a portfolio based on the efficient frontier determination.

In some embodiments, the program instructions, when executed, further cause the system to provide a portfolio owner with a rebalancing alert based on the efficient frontier determination.

In some embodiments, the program instructions, when executed, further cause the system, after receiving input from the portfolio owner, rebalance a portfolio associated with the portfolio owner based on the efficient frontier determination.

In some embodiments, the program instructions, when executed, further cause the system to receive a catalog of QC algorithms and associated algorithm performance information.

In some embodiments, the portfolio optimization factor data comprises one or more of personal portfolio constraints data representing customer-defined constraints.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

DETAILED DESCRIPTION

Figure 1:
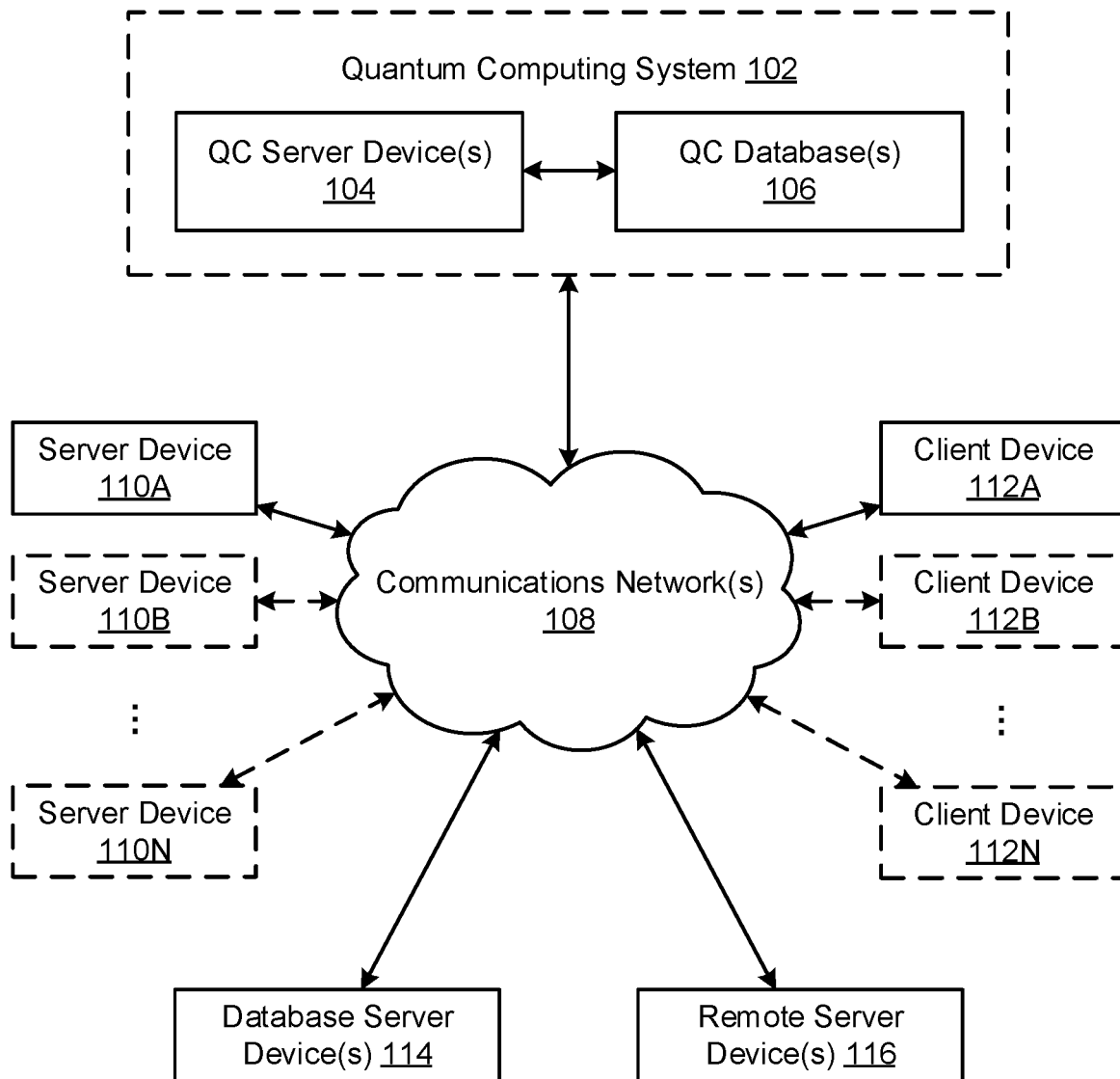
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein for using quantum computing (QC) to optimize performance of a determination related to an asset, a portfolio of assets, or a company. In some embodiments, the performance of the determination is being optimized using QC. QC and application performance monitoring (APM) may be used to identify factors related to the determination for optimization using a QC algorithm, for example, Quadratic Unconstrained Binary Optimization "QUBO", Quantum Approximate Optimization Algorithm "QAOA", Quantum Machine Learning "QML", Quantum Geometrodynamics "QGD", Quantum Monte Carlo "QMC", Harrow, Hassidim and Lloyd "HHL", or the like, executed on a particular QC machine (e.g., quantum annealer, circuit-based quantum processor, or the like).

Example embodiments may select the particular QC algorithm and QC machine for optimizing a determination. For example, example embodiments may run quantum optimization on the identified factors to determine which are best for using a particular QC algorithm and QC machine (e.g., use a quantum annealer and related algorithm on a first factor or asset, use a circuit-based quantum processor and related algorithm on a second factor or asset). In another example, example embodiments may test different QC algorithms and QC machines to generate a matrix of QC performance information for use in selecting the optimal QC algorithm and QC machine for each identified factor or asset. In yet another example, example embodiments may determine what is the best path in the sequence for QC and use a combination of different QC algorithms and QC machines for that path.

The determination being optimized may be for different applications. For example, a determination may be related to portfolio optimization, efficient frontier, tracking errors, stress testing, and/or hurricane graphics, all of which may share factors and/or may have distinct factors. For example, portfolios may include numerous assets, including, but not limited to, cash, cash deposits, stocks, bonds, real estate, mortgages, commodities, futures, options, loans, mutual funds, collateral, currencies, etc. Furthermore, these portfolios may be designed to achieve set goals, including, but not limited to, maximizing returns, maximizing returns at a certain level of risk, reaching a target goal, reaching a target goal at a target time or age, reach a targeted rate of return each year, maintain an amount in low risk assets while maintaining the remainder in a assets of a different risk level, track a benchmark, pass a stress test, pass a hurricane scenario, etc. Given the number of factors that may be considered (e.g., types of asset, budget constraints, holding time, risk tolerance, etc.), the extensive number of assets held in a portfolio, and the ever-changing state of the market as well as its effect on each of the assets, financial modeling and optimization algorithms are often used to be optimize a determination regarding a portfolio (e.g., number and type of assets held). By way of example, a portfolio may be concerned with maximizing returns while also minimizing risk. As is evident by the number and/or types of assets in a portfolio, the number of simulations and calculations that must occur, for example, for each potential permutation of the portfolio's assets in order to optimize a determination, such as performance of the portfolio, may exceed the capability of conventional computing.

Some attempts directed at accomplishing these calculations have relied upon machine learning and other dynamic programming techniques (e.g., reinforcement learning) to train a model that maximizes cumulative reward (e.g., maximizing return). Emerging computing technology in the space of Quantum Computing further illustrate promise due to their ability to perform a significant number of complex calculations in a shorter time period than traditional computers. Furthermore, the randomly deterministic nature of quantum computing matches the goal of portfolio optimization in which outcomes and performance of a particular portfolio are evaluated under a large number of randomly generated scenarios.

In another example, the optimization may be related to post-quantum cryptography (PQC). Traditionally, data owners and third-party hosting services use hybrid cryptosystems to safeguard the confidentiality, integrity, and authenticity of enormous volumes of protected data and complex IT systems. These hybrid cryptosystems typically use a combination of asymmetric cryptography (e.g., public key cryptography), such as the Rivest-Shamir-Adleman (RSA) cryptosystem, and symmetric cryptography (e.g., secret key cryptography), such as the Advanced Encryption Standard (AES). One example of a hybrid cryptosystem is the Transport Layer Security (TLS) protocol, which relies on asymmetric cryptography for authentication and key management to establish session keys, and symmetric cryptography for session encryption and integrity validation. This may or may not be different from hybrid mode approach to PQC, wherein a tool in hand (e.g., a digital certificate) is a combination of tradition cryptography, such as RSA, and post quantum cryptography, such as Dilithium, and such a hybrid mode approach may be referred to as a hybrid scheme.

However, these cryptosystems are vulnerable to quantum algorithms implemented on quantum computers. For instance, asymmetric encryption, key exchange, and digital signature rely on mathematical problems such as the integer factorization problem (e.g., as used in RSA) and the discrete logarithm problem (e.g., as used in Digital Signature Algorithm (DSA), Elliptic Curve DSA (ECDSA), Diffie-Hellman (DH), and Elliptic Curve DH (ECDH)). It is widely believed that a large-scale fault tolerant quantum computer could effectively break modern public key cryptosystems by solving instances of the integer factorization problem and the discrete logarithm problem quickly enough that keys reverse engineered based on those solutions would still be valid.

In one illustrative example, a quantum computer implementing Shor's algorithm could determine the private keys used for current public-key systems in a relatively short time because Shor's algorithm provides a faster cryptanalysis method for solving integer factorization than a brute force method (e.g., guessing prime numbers). For instance, Shor's algorithm uses the quantum Fourier transform (QFT) instead of its slower classical counterpart, the fast Fourier transform (FFT). Further, Shor's algorithm can be modified to compute discrete logarithms, including discrete logarithms used for elliptic-curve cryptography (ECC).

In another illustrative example, a quantum computer implementing Grover's algorithm could effectively perform an exhaustive key search because Grover's algorithm provides quadratic speedup and thereby could brute-force attack an N-bit symmetric cryptographic key in only about $2^{(N/2)}$ iterations. In some instances, for symmetric cryptographic techniques that support a doubled key length (e.g., AES supports doubling a 128-bit key to 256 bits), doubling the key length of the symmetric cryptographic key may provide sufficient protection against Grover's algorithm because a brute-force attack on a 2N-bit symmetric cryptographic key would require about $2^N$ iterations. For example, a 256-bit symmetric cryptographic key (e.g., AES-256) may only provide 128 bits of security in a quantum computing environment. However, any migration plan that involves doubling the key length of the symmetric cryptographic key must also evaluate the impact of the doubled key length on the performance of related applications and the additional requirements of computational resources.

Although quantum computers capable of such feats are still believed to be several years away, the threat of a "harvest now and decrypt later attack" makes quantum computing an immediate real threat, even if the threat will not be actionable until a sufficiently robust quantum computer is developed in the future. The "harvest now and decrypt later attack" is a long-game attack where a bad actor scrapes, collects, or harvests (e.g., records and stores) encrypted data, such as data streaming through the Internet or cloud, by the way of breaches or passive interception and then hoards the encrypted data, waiting for the day when quantum computers can determine the cryptographic keys to the harvested data. This bad actor could be storing data to or from a specific website, server, email client, or other target of attack or, given sufficient motivation and resources, recording petabytes of data each hour from general internet traffic. Once quantum computers are capable of determining the cryptographic keys associated with the harvested encrypted data, the bad actor might use those cryptographic keys to decrypt the previously encrypted data. For instance, persistent data, such as mortgage information and financial records, encrypted or digitally signed with today's cryptographic algorithms will be at risk even if the necessary quantum computing technology is not available for seven to ten years or even later. Subsequently, with advancements in artificial intelligence and machine learning and the exponential increase in data processing compute power, a bad actor could attack a data vault to extract meaningful information from the decrypted petabytes of data. The code may be related to providing post-quantum cryptography (PQC) that mitigates the vulnerability of traditional cryptographic algorithms by providing techniques for migrating enormous volumes of data and complex IT systems to PQC technologies and platforms that are not vulnerable to attack by a quantum computer.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means "including, but not limited to." The term comprising should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "in some embodiments," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" or "server device" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "quantum basis" refers to sets of orthogonal quantum states, including, but not limited to, pairs of photonic polarization states. The pairs of photonic polarization states may comprise, for example, the rectilinear, diagonal, and circular photonic polarization states. The "rectilinear basis" refers to the pair of rectilinear photonic polarization states comprising the horizontal photon polarization state $|0\rangle$ and the vertical photon polarization state $|1\rangle$. The "diagonal basis" refers to the pair of diagonal photonic polarization states comprising the diagonal photon polarization state of 45 degrees and the diagonal photon polarization state 135 degrees. The "circular basis" refers to the pair of circular photonic polarization states comprising the left circular photon polarization state $|L\rangle$ and the right circular photon polarization state $|R\rangle$.

The term "quantum particle" refers to photons, atoms, electrons, molecules, ions, or other suitable particles or quasi-particles (e.g., composite fermions). The term "entangled quantum particle" refers to two or more photons, atoms, electrons, molecules, ions, or other suitable particles or quasi-particles entangled according to the principles of quantum entanglement.

The term "qubit" refers to a basic unit of quantum information comprising a two-state, or two-level, quantum mechanical system, such as: the polarization of a single photon (e.g., a photon encoded using a quantum basis as previously defined); the spin of a single electron (e.g., a spin qubit comprising the spin up state $|1\rangle$ and the spin down state $|0\rangle$); the energy level of a single atom (e.g., a superconducting qubit); the Hall conductance of electron systems (e.g., qubits based on a quantum Hall effect, such as an integer quantum Hall effect, a fractional quantum Hall effect, or a quantum spin Hall effect); the vibration state of a single carbon nanotube or nanoparticle (e.g., a carbon qubit, a carbon nanotube or nanoparticle coupled to a spin qubit, a carbon nanotube or nanoparticle coupled to a superconducting qubit); the electronic state of an ion (e.g., a trapped ion); a transmission line shunted plasma oscillation qubit (e.g., a fixed-frequency transmon qubit, a frequency-tunable transmon qubit); a charge qubit (e.g., a superconducting charge qubit); a defect (e.g., a vacancy, a dopant, or a combination thereof, such as a nitrogen-vacancy center or a silicon-vacancy center) in a diamond structure (e.g., a diamond qubit); or any other suitable qubit. Qubits may exist in multiple states simultaneously and can be made of any suitable quantum particle, including entangled quantum particles. Qubits may exist in multiple states simultaneously and may be made of quantum particles such as photons, atoms, electrons, molecules, ions, or other suitable particles, such as quasi-particles. In some embodiments, qubits may be entangled according to the principles of quantum entanglement. For example, a pair of entangled qubits may comprise a first entangled qubit and a second entangled qubit, where measurement of the first entangled qubit causes the collapse of the second entangled qubit such that the first entangled qubit and the second entangled qubit are equal (e.g., both "0" or both "1") when measured using the same quantum basis.

The term "optical line" refers to an optical communications path. For example, an optical line may comprise an optical fiber, an optical waveguide, a fiberoptic cable, a non-polarization maintaining optical fiber, an optical transmission line, a quantum line, or a combination thereof. The term optical line broadly encompasses on-chip optical lines.

The term "quantum line" refers to a quantum communications path. For example, a quantum line may comprise a polarization-maintaining (PM) optical fiber (PMF or PM fiber), photonic transmission lines, photonic crystals, photonic circuitry, free space (e.g., air, vacuum), or a combination thereof. In some embodiments, a PM fiber uses birefringence to maintain the polarization states of photons. This is normally done by causing consistent asymmetries in the PM fiber. Example PM fiber types include: panda fiber which is used in telecom; elliptical clad fiber; and bowtie fiber. Any of these three designs uses birefringence by adding asymmetries to the fiber through shapes and stresses introduced in the fiber. This causes two polarization states to have different phase velocities in the fiber. As such, an exchange of the overall energy of the two modes (polarization states) becomes practically impossible. The term optical line broadly encompasses on-chip quantum lines.

The term "on-chip encoder" and "on-chip decoder" is used herein to refer to any device that respectively encodes or decodes a qubit of information, or in time-bins of information, on a photon or an electron. In this regard, the qubit decoder may comprise an optoelectronic device as described below.

The terms "optoelectronic device," "optoelectronic component," "laser device," "light source," "single photon source," "particle source," and similar terms are used herein interchangeably to refer to any one or more of (including, but not limited to, combinations of): a polarized light modulator (PLM); a polarized light demodulator (PLD); a quantization circuit; a laser device, such as a diode laser, a vertical cavity surface emitting laser (VCSEL), a semiconductor laser, a fiberoptic laser, or an edge-emitting laser (e.g., a gallium arsenide (GaAs) edge-emitting laser comprising an indium gallium arsenide (InGaAs) quantum well); a light source; a single photon source; a modulator or modulating circuit; a photodetector device, such as a photodetector, an array of photodetectors, or a photodetector panel; a light emitting device, such as a light emitting diode (LED), an array of LEDs, an LED panel, or an LED display; a sensing device, such as one or more sensors; any other device equipped with at least one of the materials, structures, or layers described herein; an optical component, such as an optical lens, attenuator, deflector, phase shifter, filter, mirror, window, diffuser, prism, lenses, crystals (e.g., non-linear crystals), wave plates, beam splitter, bit manipulator, polarizer, or diffraction grating; an interferometer implemented as a Mach-Zehnder interferometer (MZI), Fabry-Perot interferometer, Michelson interferometer, any other suitable configuration, or any combination or permutation thereof; any device configured to function as any of the foregoing devices; or any combination thereof. In some embodiments, the laser device may use a VCSEL to generate photons, qubits (e.g., by modulating photons), or both. In some embodiments, a polarization pulse shaper may be integrated with the laser chip on the same laser device. In some embodiments, modulating circuitry (e.g., a modulating circuit) may be implemented on a board. Examples of a laser device may comprise a fiberoptic laser with a polarizing component, an edge-emitting laser, a VCSEL, a PLM, or any other suitable device. In some embodiments, the laser may generate photons, qubits, or both in the infrared or near-infrared range (e.g., 1550 nanometers (nm), 980 nm, 900 nm). For example, a laser device may be an edge-emitting laser chip having a footprint smaller than one square millimeter and a thickness less than a few micrometers (microns) and comprising a gallium arsenide (GaAs)-based edge-emitting laser, a modulating circuit, and an attenuator or deflector. Each of the MZIs disclosed herein may comprise a combination of mirrors, beam splitters, photodetectors fiberoptic cables, lenses, nonlinear crystals, wave plates, motors (e.g., servo motors), motion controllers (e.g., servo motor controllers), temperature controllers (e.g., thermoelectric devices), and any other suitable components arranged to perform the operations and functions disclosed herein, including, but not limited to, the controlling of optical path length. In some embodiments, a first optoelectronic device may include a particle source configured to generate single particles (e.g., photons or electrons) and transmit the generated particles through a double-slit structure to a first electron detector (e.g., "|1>") and a second electron detector (e.g., "|0>") as described herein.

The term "run-time hotspot" refers to a portion of code (i.e., program instructions that, when executed, cause a system to perform certain functions) previously executed, being executed, or to be executed.

The term "real-time purchase data" refers to data representing a real-time purchase of assets. Real-time purchase data may be initially generated at a client device then later transmitted to a QC system.

The term "real-time sell data" refers to data representing a real-time sell of a assets. Real-time sell data may be generated at a client device then later transmitted to a QC system.

The term "collateral expiration data" refers to data representing expiration and/or expiration dates of assets that expire, such as periodic expiration dates and/or triple witching dates. Collateral expiration data may be generated at a client device then later transmitted to a QC system.

The term "optimization factor data" refers to data representing factors that may be used for optimizing (which may be referred to as optimization factors) an asset, a portfolio, or a company such as: market data representing any factors that may impact markets, stock data representing any factors that may impact stocks, bond data representing any factors that may impact bonds, currency data representing any factors that may impact currencies and/or foreign exchange rates, options data representing any factors that may impact options (e.g., expiration dates, volatility, etc.), futures data representing any factors that may impact futures, commodity data representing any factors that may impact commodities, exogenous data, world economy data representing any factors that may impact world economy (e.g., populations, census, natural disasters, government actions, legislation, international events, etc.), life event data representing any personal life event associated with a customer associated with the portfolio (e.g., graduating school, obtaining a job, getting married, having children, caring for others, and/or retirement, etc.), personal portfolio factor data representing customer-defined personal preference on managing a portfolio (e.g., maximize growth, minimize volatility, attain a specified value, keep a specified value of cash in the portfolio, minimize risk, etc.), personal portfolio constraints data representing customer-defined constraints (e.g., owning assets or not owning assets associated with a specified location, owning assets or not owning assets at certain times, owning assets or not owning assets associated with a certain industries (e.g., sin stocks), owning assets or not owning assets related to specified products, and/or owning assets or not owning assets related to entities, organizations, and/or businesses, etc.), or the like. A QC system may filter optimization factor data to generate filtered portfolio optimization factor data and use the filtered portfolio optimization factor data to optimize a determination regarding the portfolio, such as an optimization determination, efficient frontier determination, tracking error determination, and/or stress testing determination. The QC system may also use one or more sets of optimization factor data or filtered portfolio optimization factor data in testing simulations of portfolio, such as CVAR (conditional value at risk) or CCAR (comprehensive capital analysis and review) testing simulations.

The term "testing scenario" refers to scenarios that may be used for stress testing simulations and/or forecasts for different factors. Testing scenarios may include specific types of tests, such as CVAR testing or CCAR testing. The testing of a testing scenario may be performed by the QC system, which may include optimizing a determination for optimization factor data related to the testing scenario. In some embodiments, the QC system may perform testing simulations iteratively or simultaneously on a periodic or an on-demand basis using one or more QC algorithms.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by one or more networked devices, such as one or more servers, remote servers, cloud-based servers (e.g., cloud utilities), or other network entities, and configured to communicate with one or more devices, such as one or more server devices, client devices, database server devices, remote server devices, other suitable devices, or a combination thereof.

In some instances, the method, system, apparatus, and computer program product of an example embodiment may be embodied by one or more quantum communications circuitries, such as one or more quantum particle encoders, quantum particle decoders, laser devices, quantum lines, quantum particle storage devices, other suitable quantum communications devices or components, or a combination thereof.

Example embodiments of the client devices include any of a variety of stationary or mobile computing devices, such as a mobile telephone, smartphone, smartwatch, smart speaker, portable digital assistant (PDA), tablet computer, laptop computer, desktop computer, kiosk computer, automated teller machine (ATM), point of sale (PoS) device, electronic workstation, any other suitable computing device, or any combination of the aforementioned devices.

FIG. 1 illustrates a system diagram of a set of devices that may be involved in some example embodiments described herein. In this regard, FIG. 1 discloses an example environment 100 within which embodiments of the present disclosure may operate to provide portfolio optimization. As illustrated, a QC system 102 may be connected to one or more QC server devices 104 in communication with one or more QC databases 106. The QC system 102 may be connected to one or more server devices 110A-110N, one or more client devices 112A-112N, one or more database server devices 114, and one or more remote server devices 116 through one or more communications networks 108. One or more communications networks 108 may include any suitable network or combination of networks, such as a virtual network, the Internet, a local area network (LAN), a Wi-Fi network, a Worldwide Interoperability for Microwave Access (WiMAX) network, a home network, a cellular network, a near field communications (NFC) network, other types of networks, or a combination thereof. In some embodiments, the QC system 102 may be configured to provide portfolio optimization as described in further detail below.

The QC system 102 may be embodied as one or more specialized circuitries, computers, or computing systems and may comprise one or more QC server devices 104 and one or more QC databases 106. The one or more QC server devices 104 may be embodied as one or more servers, remote servers, cloud-based servers (e.g., cloud utilities), processors, any other suitable server devices, or any combination thereof. The one or more QC server devices 104 may be configured to receive, process, generate, and transmit data, signals, and electronic information to facilitate the operations of the QC system 102. The one or more QC databases 106 may be embodied as one or more data storage devices, such as Network Attached Storage (NAS) devices or separate databases or servers. The one or more QC databases 106 may be configured to store and provide access to data and information used by the QC system 102 to facilitate the operations of the QC system 102. For example, the one or more QC databases 106 may store user account credentials for users of one or more server devices 110A-110N, one or more client devices 112A-112N, one or more database server devices 114, one or more remote server devices 116, or a combination thereof. In another example, the one or more QC databases 106 may store data regarding device characteristics for the one or more server devices 110A-110N, one or more client devices 112A-112N, one or more database server devices 114, one or more remote server devices 116, or a combination thereof. In some embodiments, the one or more QC server devices 104, the one or more QC databases 106, or both may include or store various data and electronic information associated with one or more data, data attributes, data envelopes, enveloped data structures, portfolio data, collateral data, risk level data, time data, policy information, real-time purchase data, real-time sell data, collateral expiration data, optimization factor data, life event data, personal portfolio factor data, machine learning model, non-QC algorithms, non-QC algorithm performance information, QC algorithm performance information, QC algorithms, other machine learning techniques, graphical user interface (GUI) data, any other suitable data or electronic information, any links or pointers thereto, or combinations thereof. In some embodiments, the one or more QC server devices 104, the one or more QC databases 106, or both may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more server devices 110A-110N may be embodied by one or more computing devices. In some embodiments, the one or more server devices 110A-110N may be embodied as one or more servers, remote servers, cloud-based servers (e.g., cloud utilities), processors, or any other suitable devices, or any combination thereof. In some embodiments, the one or more server devices 110A-110N may receive, process, generate, and transmit data, signals, and electronic information to facilitate the operations of the QC system 102. Information received by the QC system 102 from one or more server devices 110A-110N may be provided in various forms and via various methods. In some embodiments, the one or more server devices 110A-110N may include or store various data and electronic information associated with one or more data, data attributes, data envelopes, enveloped data structures, asset data, portfolio data, collateral data, risk level data, time data, policy information, real-time purchase data, real-time sale data, life event data, personal portfolio factor data, optimization factor data, stress testing factor data, stress testing scenario data, and/or hurricane scenario data, collateral expiration data, life event data, personal portfolio factor data, personal portfolio constraints data, machine learning techniques, GUI data, any other suitable data or electronic information, any links or pointers thereto, or combinations thereof. In some embodiments, the one or more server devices 110A-110N may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more client devices 112A-112N may be embodied by one or more computing devices. Information received by the QC system 102 from the one or more client devices 112A-112N may be provided in various forms and via various methods. For example, the one or more client devices 112A-112N may be smartphones, laptop computers, netbooks, tablet computers, wearable devices, desktop computers, ATMs, PoS devices, electronic workstations, or the like, and the information may be provided through various modes of data transmission provided by these client devices. In some embodiments, the one or more client devices 112A-112N may include or store various data and electronic information associated with one or more users. For example, the one or more client devices 112A-112N may include or store user information (including, but not limited to, user profile information), any other suitable data, or any combination thereof. In some embodiments, the one or more client devices 112A-112N may include or store various data and electronic information associated with one or more data, data attributes, data envelopes, enveloped data structures, portfolio data, collateral data, risk level data, time data, policy information, real-time purchase data, real-time sale data, life event data, personal portfolio factor data, optimization factor data, stress testing factor data, stress testing scenario data, and/or hurricane scenario data, collateral expiration data, life event data, personal portfolio factor data, personal portfolio constraints data, machine learning techniques, GUI data, any other suitable data or electronic information, any links or pointers thereto, or combinations thereof. In some embodiments, the one or more client devices 112A-112N may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

In embodiments where a client device 112 is a mobile device, such as a smartphone or tablet, the mobile device may execute an "app" (e.g., a thin-client application) to interact with the QC system 102, one or more server devices 110A-110N, one or more database server devices 114, one or more remote server devices 116, or a combination thereof. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with camera circuitry, microphone circuitry, sensor circuitry, location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., server devices, client devices, database server devices, remote server devices). Communication with hardware and software modules executing outside of the app is typically provided via APIs provided by the mobile device operating system.

The one or more database server devices 114 may be embodied by one or more computing devices, server devices, servers, data storage devices, databases, or a combination thereof. In some embodiments, the one or more database server devices 114 may be embodied as one or more data storage devices, such as one or more NAS devices, or as one or more separate databases or database servers. In some embodiments, the one or more database server devices 114 may be embodied as one or more servers, remote servers, cloud-based servers (e.g., cloud utilities), processors, or any other suitable devices, or any combination thereof. In some embodiments, the one or more database server devices 114 may receive, process, generate, and transmit data, signals, and electronic information to facilitate the operations of the QC system 102. Information received by the QC system 102 from one or more database server devices 114 may be provided in various forms and via various methods. It will be understood, however, that in some embodiments, the one or more database server devices 114 need not themselves be databases or database servers but may be peripheral devices communicatively coupled to databases or database servers.

In some embodiments, the one or more database server devices 114 may include or store various data and electronic information associated with one or more data, data attributes, data envelopes, enveloped data structures, portfolio data, collateral data, risk level data, time data, policy information, real-time purchase data, real-time sale data, life event data, personal portfolio factor data, optimization factor data, stress testing factor data, stress testing scenario data, and/or hurricane scenario data, machine learning techniques, GUI data, any other suitable data or electronic information, any links or pointers thereto, or combinations thereof. In some embodiments, the one or more database server devices 114 may include or store exogenous data. The exogenous data may comprise, for example, public sentiment data structures (e.g., a widespread data breach at a third-party system, such as a merchant; a stock market crash; a geopolitical event), news articles, FDIC data, NIST data, company intranet data, technological advancements, scientific publications, financial data (e.g., stock market data, commodity market data, money market data), legal data (e.g., lawsuit data, regulatory data), any other suitable exogenous data, or any combination thereof. In some embodiments, the one or more database server devices 114 may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more remote server devices 116 may be embodied by one or more computing devices, server devices, servers, data storage devices, databases, or a combination thereof. In some embodiments, the one or more remote server devices 116 may be embodied as one or more data storage devices, such as one or more NAS devices, or as one or more separate databases or database servers. In some embodiments, the one or more remote server devices 116 may be embodied as one or more servers, remote servers, cloud-based servers (e.g., cloud utilities), processors, or any other suitable devices, or any combination thereof. In some embodiments, the one or more remote server devices 116 may receive, process, generate, and transmit data, signals, and electronic information to facilitate the operations of the QC system 102. Information received by the QC system 102 from one or more remote server devices 116 may be provided in various forms and via various methods. It will be understood, however, that in some embodiments, the one or more remote server devices 116 need not themselves be servers but may be peripheral devices communicatively coupled to servers.

In some embodiments, the one or more remote server devices 116 may include or store various data and electronic information associated with one or more data, data attributes, data envelopes, enveloped data structures, portfolio data, collateral data, risk level data, time data, policy information, real-time purchase data, real-time purchase data, real-time sale data, life event data, personal portfolio factor data, optimization factor data, stress testing factor data, stress testing scenario data, and/or hurricane scenario data, machine learning techniques, GUI data, exogenous data, any other suitable data or electronic information, any links or pointers thereto, or combinations thereof. In some embodiments, the one or more remote server devices 116 may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

In some embodiments, the one or more server devices 110A-110N, the one or more client devices 112A-112N, the one or more database server devices 114, the one or more remote server devices 116, or any combination thereof may interact with the QC system 102 over one or more communications networks 108. As yet another example, the one or more server devices 110A-110N, the one or more client devices 112A-112N, the one or more database server devices 114, the one or more remote server devices 116, or a combination thereof may include various hardware or firmware designed to interface with the QC system 102. For example, an example server device 110A may be a session authentication server modified to communicate with the QC system 102, and another example server device 110B may be a purpose-built session authentication server offered for the primary purpose of communicating with the QC system 102. As another example, an example client device 112A may be a user's smartphone and may have an application stored thereon facilitating communication with the QC system 102, whereas another example client device 112B may be a purpose-built device offered for the primary purpose of communicating with the QC system 102.

In some embodiments, the one or more server devices 110A-110N, the one or more client devices 112A-112N, the one or more database server devices 114, the one or more remote server devices 116, or any combination thereof may interact with the QC system 102 over one or more PQC communications channels. The PQC communications channel may be, for example, a communications channel over which data is transmitted and received using a PQC cryptographic technique, such as a PQC back channel (e.g., a PQC out-of-band communications channel).

As a foundation for some embodiments, the QC system 102 may provide for receiving data and generating a set of data attributes about the data. In some embodiments, the QC system 102 may provide for receiving, directly or indirectly via communications network 108, the data from one or more of the one or more client devices 112A-112N, the one or more server devices 110A-110N, the one or more database server devices 114, any other suitable device, or any combination thereof. In some embodiments, the QC system 102 may further provide for generating a data envelope based on the set of data attributes. In some embodiments, the QC system 102 may further provide for generating an enveloped data structure based on the data envelope and the data.

In some embodiments, the QC system may communicate with one or more of the one or more client devices 112A-112N, the one or more server devices 110A-110N, the one or more database server devices 114, the one or more remote server devices 116, any other suitable device, or any combination thereof.

In some embodiments, the QC system 102 may further provide for generating a portfolio view (e.g., GUI) for enabling customer input of life event data representing any personal life event associated with a customer associated with the portfolio, personal portfolio factor data representing customer-defined personal preference on managing a portfolio, personal portfolio constraints data representing customer-defined constraints, or the like.

Example Implementing Apparatuses

The QC system 102 described with reference to FIG. 1 may be embodied by one or more computing systems, such as apparatus 200 shown in FIG. 2. In some embodiments, apparatus 200 shown in FIG. 2 may represent an example QC system 102, a QC server device 104, a QC database 106, or a combination thereof.

Figure 2:
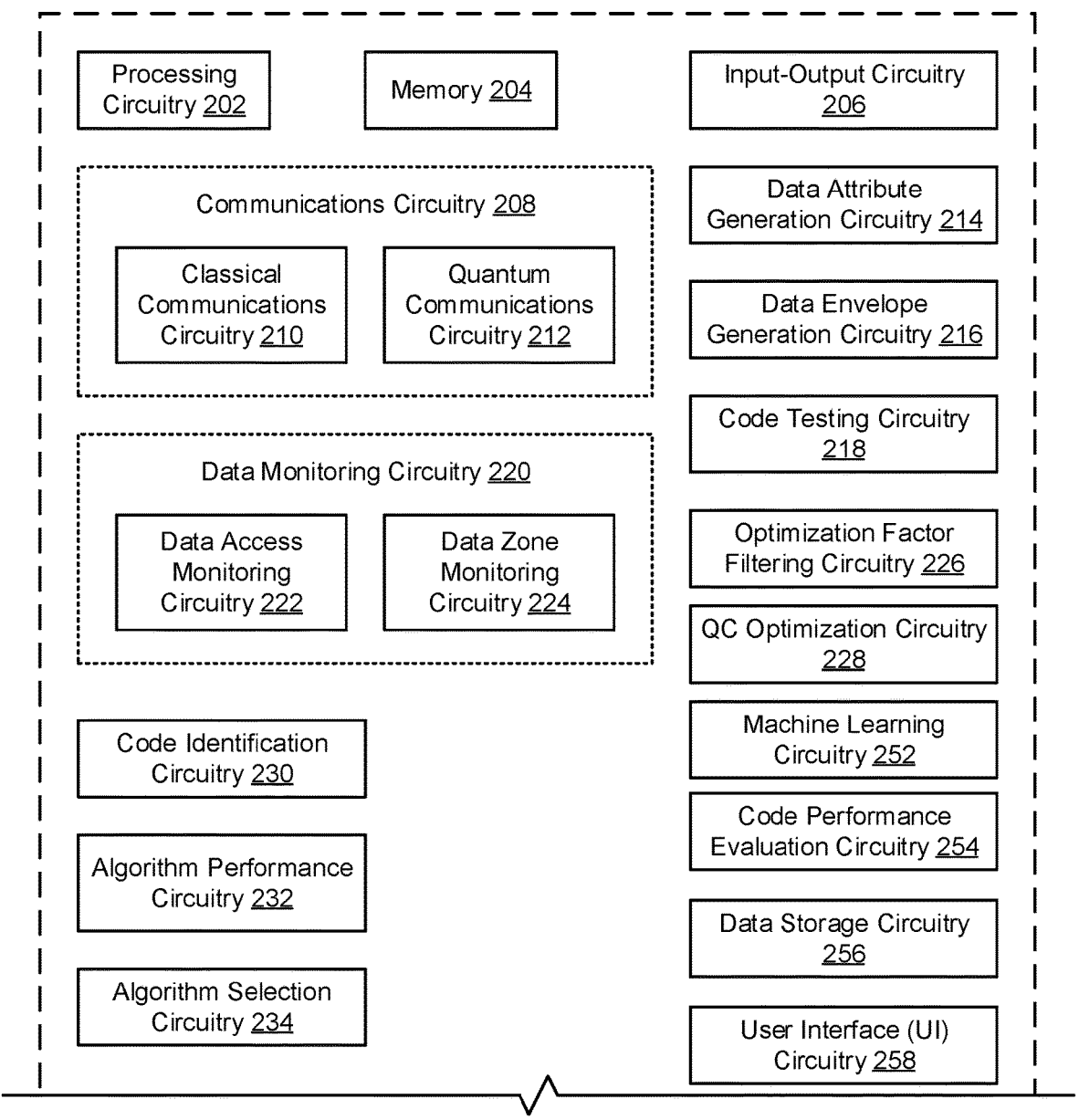
FIG. 2 illustrates a schematic block diagram of example circuitries that may perform various operations in accordance with some example embodiments described herein.

As illustrated in FIG. 2, the apparatus 200 may include one or more of processing circuitry 202, memory 204, input-output circuitry 206, communications circuitry 208 (including, but not limited to, classical communications circuitry 210 and quantum communications circuitry 212), data attribute generation circuitry 214, data envelope generation circuitry 216, code testing circuitry 218, data monitoring circuitry 220 (including, but not limited to, data access monitoring circuitry 222 and data zone monitoring circuitry 224), optimization factor filtering circuitry 226, QC optimization circuitry 228, code identification circuitry 230, algorithm performance circuitry 232, algorithm selection circuitry 234, machine learning circuitry 252, code performance evaluation circuitry 254, data storage circuitry 256, user interface (UI) circuitry 258, any other suitable circuitry, or any combination thereof. The apparatus 200 may be configured to execute the operations described above with respect to FIG. 1 and below with respect to FIGS. 3 and 5-7.

In some embodiments, the processing circuitry 202 (and/or co-processor or any other processing circuitry assisting or otherwise associated with the processor) may be in communication with the memory 204 via a bus for passing information among components of the apparatus 200. The memory 204 may be non-transitory and may include, for example, one or more volatile and/or non-volatile memories. For example, the memory may be an electronic storage device (e.g., a computer readable storage medium). The memory 204 may be configured to store information, data, data structures, content, control signals, applications, instructions, or the like, for enabling the apparatus to carry out various functions in accordance with example embodiments of the present disclosure. In some instances, the memory 204 may be configured to store data, data structures, data elements, and electronic information associated with one or more data, data attributes, data envelopes, enveloped data structures, portfolio data, collateral data, risk level data, time data, policy information, real-time purchase data, real-time sale data, life event data, personal portfolio factor data, optimization factor data, stress testing factor data, stress testing scenario data, and/or hurricane scenario data, machine learning model, non-QC algorithms, non-QC algorithm performance information, QC algorithm performance information, QC algorithms, other machine learning techniques, graphical user interface (GUI) data, any other suitable data or electronic information, or combinations thereof. It will be understood that the memory 204 may be configured to store any data, data structures, electronic information, requests, embodiments, examples, figures, techniques, processes, operations, methods, systems, apparatuses, or computer program products described herein, or any combination thereof.

The processing circuitry 202 may be embodied in a number of different ways and may, for example, include one or more processing devices configured to perform independently. Additionally, or alternatively, the processing circuitry 202 may include one or more processors configured in tandem via a bus to enable independent execution of instructions, pipelining, multithreading, or a combination thereof. The use of the term "processing circuitry" may be understood to include a single core processor, a multi-core processor, multiple processors internal to the apparatus, remote or "cloud" processors, or a combination thereof.

In an example embodiment, the processing circuitry 202 may be configured to execute instructions stored in the memory 204 or otherwise accessible to the processor. Alternatively, or additionally, the processing circuitry 202 may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the functionalities and operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a command provided by a user. The input-output circuitry 206 may comprise a user interface (e.g., a user interface generated by user interface circuitry included in the apparatus 200) comprising a display that may include a web user interface, a mobile application, a client device, a display device, a display screen, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202, the input-output circuitry 206 (which may utilize the processing circuitry 202), or both may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may be configured to generate (e.g., by UI circuitry 258) user interface data (e.g., data attribute GUI data, risk profile GUI data, PQC optimization GUI data, data monitoring GUI data) for display by one or more other devices with which one or more users directly interact and transmit the generated user interface data to one or more of those devices.

The communications circuitry 208 may be any device or circuitry embodied in either hardware or a combination of hardware and software that is configured to receive and/or transmit classical data, quantum information, or both from or to a network and/or any other device, circuitry, or module in communication with the apparatus 200. In this regard, the communications circuitry 208 may include, for example, classical communications circuitry 210 and quantum communications circuitry 212.

The classical communications circuitry 210 may be any device or circuitry embodied in either hardware or a combination of hardware and software that is configured to receive and/or transmit data from or to a network and/or any other device, circuitry, or module in communication with the apparatus 200. In this regard, the classical communications circuitry 210 may include, for example, a network interface for enabling communications with a wired or wireless communications network. For example, the classical communications circuitry 210 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols.

The quantum communications circuitry 212 may be any device or circuitry embodied in either hardware or a combination of hardware and software that is configured to receive and/or transmit quantum particles, such as photons, electrons, or both from or to any other device, circuitry, or module in communication with the apparatus 200. In this regard, the quantum communications circuitry 212 may include, for example, optical components such as an optical communications interface for enabling optical communications over a quantum line. In some embodiments, the quantum communications circuitry 212 may include encoding circuitry (e.g. an on-chip encoder) to generate a set of entangled quantum particles (e.g., qubits, qutrits, qudits) and decoding circuitry (e.g., an on-chip decoder) to receive (e.g., directly or indirectly, such as via switching circuitry), store, and measure a set of entangled quantum particles. In some embodiments, the quantum communications circuitry 212 may further include quantum basis determination circuitry configured to determine the quantum bases, or sets of quantum bases, for encoding and decoding of a given set of quantum particles. In some embodiments, the quantum communications circuitry 212 may include or be communicatively coupled to one or more quantum storage devices configured to store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, and combinations thereof.

In some embodiments, the communications circuitry 208 may be configured to receive, retrieve, or obtain data. In some embodiments, the data may comprise data access control information, a link or pointer to the data (e.g., a link to a credit card number), a bitstream, a binary large object (BLOB), any other suitable data, or any combination thereof. In some embodiments, the data may have been encrypted based on a set of encryption attributes, such as a set of non-PQC encryption attributes, a set of PQC encryption attributes, or both (e.g., double encryption where the data has been encrypted based on a set of non-PQC encryption attributes and then double encrypted based on a set of PQC encryption attributes). In some embodiments, the communications circuitry 208 may be configured to receive, retrieve, or obtain the data from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the communications circuitry 208 may be configured to receive, retrieve, or obtain a set of data attributes about the data. In some embodiments, the communications circuitry 208 may be configured to receive, retrieve, or obtain the set of data attributes from another circuitry, such as processing circuitry 202, data attribute generation circuitry 214, any other suitable circuitry, or a combination thereof. In some embodiments, the communications circuitry 208 may be configured to receive, retrieve, or obtain the set of data attributes from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, where the data is included in an enveloped data structure comprising the data and a data envelope that comprises the set of data attributes, the communications circuitry 208 may be configured to receive, retrieve, or obtain the set of data attributes by extracting the set of data attributes from the data envelope.

In some embodiments, the communications circuitry 208 may be configured to receive, retrieve, or obtain policy information associated with the data. In some embodiments, the communications circuitry 208 may be configured to receive, retrieve, or obtain the policy information from another circuitry, such as processing circuitry 202, policy attribute generation circuitry 226, any other suitable circuitry, or a combination thereof. In some embodiments, the communications circuitry 208 may be configured to receive, retrieve, or obtain the policy information from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the communications circuitry 208 may be configured to receive, retrieve, or obtain real-time purchase data, real-time sale data, life event data, personal portfolio factor data, optimization factor data, stress testing factor data, stress testing scenario data, and/or hurricane scenario data. In some embodiments, the communications circuitry 208 may be configured to receive, retrieve, or obtain the real-time purchase data, real-time sale data, life event data, personal portfolio factor data, optimization factor data, stress testing factor data, stress testing scenario data, and/or hurricane scenario data, such as processing circuitry 202, UI circuitry 258, any other suitable circuitry, or a combination thereof. In some embodiments, the communications circuitry 208 may be configured to receive, retrieve, or obtain the real-time purchase data, real-time sale data, life event data, personal portfolio factor data, optimization factor data, stress testing factor data, stress testing scenario data, and/or hurricane scenario data from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, where the data is included in an enveloped data structure comprising the data and a data envelope that comprises the real-time purchase data, real-time sale data, life event data, personal portfolio factor data, optimization factor data, stress testing factor data, stress testing scenario data, and/or hurricane scenario data, or life event data, the communications circuitry 208 may be configured to receive, retrieve, or obtain the real-time purchase data, real-time sale data, life event data, or personal portfolio factor data by extracting the real-time purchase data, real-time sale data, life event data, or personal portfolio factor data from the data envelope.

In some embodiments, the communications circuitry 208 may be configured to receive, retrieve, or obtain optimization factor data. In some embodiments, the communications circuitry 208 may be configured to receive, retrieve, or obtain the collateral expiration data and optimization factor data from another circuitry, such as processing circuitry 202, input-output circuitry 206, UI circuitry 258, any other suitable circuitry, or a combination thereof. In some embodiments, the communications circuitry 208 may be configured to receive, retrieve, or obtain the collateral expiration data and optimization factor data from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the communications circuitry 208 may be configured to receive, retrieve, or obtain QC algorithm performance information associated with a set of QC algorithms. In some embodiments, the communications circuitry 208 may be configured to receive, retrieve, or obtain the QC algorithm performance information from another circuitry, such as processing circuitry 202, algorithm performance circuitry 234, any other suitable circuitry, or a combination thereof. In some embodiments, the communications circuitry 208 may be configured to receive, retrieve, or obtain the QC algorithm performance information from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

The data attribute generation circuitry 214 includes hardware components designed or configured to request, receive, process, generate, and transmit data, data structures, control signals, and electronic information for use in PQC. In some embodiments, the data attribute generation circuitry 214 may be configured to generate a set of data attributes about data, such as the data received by the communications circuitry 208, based on the data. In some embodiments, the data attribute generation circuitry 214 may be configured to generate the set of data attributes about the data based on the data itself, overhead data (e.g., protocol overhead, header, metadata) associated with the data, any other suitable data or electronic information, or any combination thereof. In some embodiments, the data attribute generation circuitry 214 may be configured to generate the set of data attributes about the data based on a machine learning technique, such as a machine learning technique provided or performed by the code performance evaluation circuitry 254.

In some embodiments, the set of data attributes about the data may comprise a data lineage data attribute indicative of a data lineage of the data. For example, the data attribute generation circuitry 214 may be configured to generate a data lineage data attribute indicative of a data lineage of the data, wherein the set of data attributes comprises the data lineage data attribute.

In some embodiments, the set of data attributes about the data may comprise a cryptographic data attribute indicative of a cryptographic technique used to encrypt the data. In some instances, the data attribute generation circuitry 214 may be configured to generate, without user interactivity, the cryptographic data attribute based on an automated analysis of a bitstream of the data. For example, the data may comprise a bitstream, and the data attribute generation circuitry 214 may be configured to generate, based on an automated analysis of the bitstream and without user interactivity, a cryptographic data attribute indicative of a cryptographic technique used to encrypt the data, wherein the set of data attributes comprises the cryptographic data attribute.

In some embodiments, the set of data attributes about the data may comprise a cryptographic spawn log indicative of a set of cryptographic techniques used to encrypt the data. For example, the data attribute generation circuitry 214 may be configured to generate a cryptographic spawn log comprising a set of timestamps and information indicative of sets of PQC encryption attributes used to encrypt the data over a period of time (e.g., lifetime of the data; the last three years, or any other suitable period or duration of time), wherein each timestamp in the set of timestamps corresponds to a set of PQC encryption attributes used to encrypt the data at the time associated with the timestamp. In another example, the data attribute generation circuitry 214 may be configured to generate a cryptographic spawn log comprising a set of encryption identification numbers and information indicative of sets of PQC encryption attributes used to encrypt the data over an amount of encryptions (e.g., all encryptions; the last five encryptions, or any other suitable amount of encryptions), wherein each encryption identification number in the set of encryption identification numbers corresponds to a set of PQC encryption attributes used to encrypt the data at the time associated with the encryption identification number. In some embodiments, the data attribute generation circuitry 214 may be configured to generate a cryptographic spawn log comprising a timestamp and information indicative of the set of PQC encryption attributes used to encrypt the data. In some embodiments, the data attribute generation circuitry 214 may be configured to generate an updated cryptographic spawn log comprising a second timestamp and information indicative of a second set of PQC encryption attributes used to encrypt the data.

In some embodiments, the set of data attributes about the data may comprise a data access log indicative of a set of data activity monitoring information (e.g., database activity monitoring information, access credentials, user identification information, machine identification information) associated with electronic access to the data. For example, the data attribute generation circuitry 214 may be configured to generate a data access log comprising a set of timestamps and information indicative of sets of data activity monitoring information the data over a period of time (e.g., lifetime of the data; the last three years, or any other suitable period or duration of time), wherein each timestamp in the set of timestamps corresponds to a set of PQC encryption attributes used to encrypt the data at the time associated with the timestamp. In some embodiments, the set of data attributes about the data may comprise a determination that the data has been accessed. For example, the data attribute generation circuitry 214 may be configured to receive the determination that the data has been accessed from the data access monitoring circuitry 222.

In some embodiments, the set of data attributes about the data may comprise a data zone data attribute indicative of a data zone associated with the data. For example, the data attribute generation circuitry 214 may be configured to generate a data zone data attribute indicative of a data zone associated with the data, wherein the set of data attributes comprises the data zone data attribute. In some embodiments, the set of data attributes about the data may comprise a determination that the data has transitioned from a first data zone to a second data zone. For example, the data attribute generation circuitry 214 may be configured to receive the determination that the data has transitioned from a first data zone to a second data zone from the data zone monitoring circuitry 224.

The data envelope generation circuitry 216 includes hardware components designed or configured to request, receive, process, generate, and transmit data, data structures, control signals, and electronic information for use in PQC. In some embodiments, the data envelope generation circuitry 216 may be configured to generate a data envelope based on the set of data attributes. In some embodiments, the data envelope generation circuitry 216 may be configured to generate the data envelope based on the set of data attributes. In some embodiments, the data envelope may comprise the set of data attributes. In some embodiments, the data envelope generation circuitry 216 may be configured to generate the data envelope based on the set of data attributes, a risk profile data structure, any other suitable data, or any combination thereof. In some embodiments, the data envelope may comprise the set of data attributes, a risk profile data structure, any other suitable data, or any combination thereof. In some embodiments, each piece of data may have a data envelope, wherein the data envelope comprises one or more attributes about the data. In some embodiments, the data and its envelope may be referred to as a "data BLOB." In some instances, the data envelope will keep track of computing devices that accessed the data, such as computing devices that took an encrypted snapshot of the data and when that encrypted snapshot was taken.

The code testing circuitry 218 includes hardware components designed or configured to request, receive, process, generate, and transmit data, data structures, control signals, and electronic information. In an embodiment, the code testing circuitry 218 may be configured to run quantum optimization algorithms on one or more identified portions of code to improve the performance of the identified portions of code.

In another embodiment, the code testing circuitry 218 may be configured to run testing of various QC algorithms to estimate, evaluate, and/or determine QC run costs in various scenarios, which may include which factors used in a QC algorithm may be static, varied, or omitted when running a QC algorithm. In some embodiments, the identified portions of code may be related to QC based portfolio optimization, or other applicable applications. The quantum optimization algorithms may be algorithms based on one or more of Quadratic Unconstrained Binary Optimization "QUBO", Quantum Approximate Optimization Algorithm "QAOA", Quantum Machine Learning "QML", Quantum Geometrodynamics "QGD", Quantum Monte Carlo "QMC", Harrow, Hassidim and Lloyd "HHL", or the like. In some embodiments, the code testing circuitry 218 may receive indications of the identified portions of code from the code identification circuitry 230.

The data monitoring circuitry 220 includes hardware components designed or configured to request, receive, process, generate, and transmit data, data structures, control signals, and electronic information for use in PQC. In some embodiments, the data monitoring circuitry 220 may be configured to monitor data, enveloped data structures, any other suitable data or electronic information, or any combination thereof. In this regard, the data monitoring circuitry 220 may include, for example, data access monitoring circuitry 222 and data zone monitoring circuitry 224.

In some embodiments, the data monitoring circuitry 220 may be configured to monitor an enveloped data structure and identify changes in the enveloped data structure. In some embodiments, the enveloped data structure may comprise a data envelope and data. In some embodiments, the data envelope may comprise a set of data attributes about the data and a risk profile data structure indicative of a vulnerability of the data in a PQC data environment. For example, the data monitoring circuitry 220 may be configured to generate an electronic indication of the change in the enveloped data structure, such as a control signal, metadata, or flag indicative of the change. In some embodiments, the data monitoring circuitry 220 may be configured to automatically monitor the enveloped data structure in real-time and without user interactivity; automatically identify the change in the enveloped data structure in real-time and without user interactivity; and generate the electronic indication of the change in the enveloped data structure in real-time and without user interactivity.

The data access monitoring circuitry 222 includes hardware components designed or configured to request, receive, process, generate, and transmit data, data structures, control signals, and electronic information for use in PQC. In some embodiments, the data access monitoring circuitry 222 may be configured to monitor the access of data, enveloped data structures, any other suitable data or electronic information, or any combination thereof. For example, the data access monitoring circuitry 222 may be configured to determine that the data has been accessed, generate a determination that the data has been accessed, and transmit the determination that the data has been accessed to any suitable circuitry, such as the data attribute generation circuitry 214.

In some embodiments, the data access monitoring circuitry 222 may be configured to generate a data access log indicative of a set of data activity monitoring information (e.g., database activity monitoring information, access credentials, user identification information, machine identification information) associated with electronic access to the data. For example, the data access monitoring circuitry 222 may be configured to generate a data access log comprising a set of timestamps and information indicative of sets of data activity monitoring information the data over a period of time (e.g., lifetime of the data; the last three years, or any other suitable period or duration of time), wherein each timestamp in the set of timestamps corresponds to a set of PQC encryption attributes used to encrypt the data at the time associated with the timestamp. In another example, the data access monitoring circuitry 222 may be configured to generate the set of data activity monitoring information and transmit the set of data activity monitoring information to the data attribute generation circuitry 214, which may be configured to receive the set of data activity monitoring information and generate a data access log based on the set of data activity monitoring information.

In some embodiments, the optimization factor filtering circuitry 226 includes hardware components designed or configured to request, receive, process, generate, and transmit data, data structures, control signals, and electronic information for use in QC based optimization, including optimizing an asset, a portfolio, or a company, such as an optimization determination, an efficient frontier determination, a tracking error determination, and/or a stress testing determination. In some embodiments, the optimization factor filtering circuitry 226 may be configured to filter, based on pre-defined filtering criteria and/or one or more machine learning techniques, optimization factor data to generate filtered portfolio optimization factor data, filtered efficient frontier factor data, filtered tracking error factor data, filtered stress testing factor data, and/or filtered hurricane factor data. In some embodiments, the optimization factor filtering circuitry 226 may retrieve optimization factor data from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the QC optimization circuitry 228 includes hardware components designed or configured to request, receive, process, generate, and transmit data, data structures, control signals, and electronic information for use in QC based optimization. In some embodiments, the QC optimization circuitry 228 may be configured to optimize, based on optimization factor data, filtered portfolio optimization factor data, filtered efficient frontier factor data, filtered tracking error factor data, filtered stress testing factor data, filtered hurricane factor data, and/or one or more machine learning techniques to, optimize a portfolio. In some embodiments, the QC optimization circuitry 228 may retrieve optimization factor data, filtered portfolio optimization factor data, filtered efficient frontier factor data, filtered tracking error factor data, filtered stress testing factor data, filtered hurricane factor data, or the like, from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the code identification circuitry 230 includes hardware components designed or configured to request, receive, process, generate, and transmit data, data structures, control signals, and electronic information for use in any application. In some embodiments, the code identification circuitry 230 may be configured to identify portions (e.g., runtime hotspots and targeted portions) of code that need to be optimized using QC. In some embodiments, the code identification circuitry 230 may retrieve data from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, the code identification circuitry 230 may be configured to utilize application performance monitoring (APM) to evaluate code to find runtime hotspots (portions of code) and identify those runtime hotspots for QC (i.e., areas that would benefit the most from QC). In some embodiments, the code identification circuitry 230 may be running while the QC system is running to identify, in real-time, runtime hotspots for QC. Additionally, the code identification circuitry 230 may utilize a QC algorithm to identify the runtime hotspots. The QC algorithm used to identify the runtime hotspots may be algorithms based on one or more of Quadratic Unconstrained Binary Optimization "QUBO", Quantum Approximate Optimization Algorithm "QAOA", Quantum Machine Learning "QML", Quantum Geometrodynamics "QGD", Quantum Monte Carlo "QMC", Harrow, Hassidim and Lloyd "HHL", or the like. In some embodiments, the code being optimized may be related to QC based portfolio optimization. In some embodiments, the code identification circuitry 230 may receive performance information of optimized identified runtime hotspot from the code testing circuitry 218 and may further identify runtime hotspots accordingly.

The algorithm performance circuitry 232 includes hardware components designed or configured to request, receive, process, generate, and transmit data, data structures, control signals, and electronic information for use in QC applications. In some embodiments, the algorithm performance circuitry 232 may be configured to retrieve performance information associated with a set of non-QC algorithms, a set of QC algorithms, or both. In some embodiments, the algorithm performance circuitry 232 may be configured to evaluate the performance of non-QC algorithms, QC algorithms, or both when non-QC algorithms, QC algorithms, or both are utilized for optimization, which may include the generation of performance information related to the non-QC algorithms, QC algorithms, or both. The algorithm performance circuitry 232 may store a catalog of QC algorithms and associated performance information.

The algorithm selection circuitry 234 includes hardware components designed or configured to request, receive, process, generate, and transmit data, data structures, control signals, and electronic information for use in QC applications. In some embodiments, the algorithm selection circuitry 234 may receive a catalog of QC algorithms and associated performance information from the algorithm performance circuitry 232 for selecting QC algorithms. In some embodiments, the algorithm selection circuitry 234 may select one QC algorithm for each optimization, factor to be optimized, or data to be optimized. The selection may be based on, among other things, the determination to be generated from the optimization, the factor to be optimized, or the data to be optimized. In some embodiments, each QC algorithm may be defined to be associated with a distinct defined hardware.

The code performance evaluation circuitry 254 includes hardware components designed or configured to request, receive, process, generate, and transmit data, data structures, control signals, and electronic information for evaluating performance of QC or non-QC based code. In some embodiments, the code evaluation circuitry 254 may be configured to reverse engineer the code and perform static evaluation of the code. In some embodiments, the code performance evaluation circuitry 254 may compare the performance of the code with performance of one or more QC algorithms. In some embodiments, the code performance evaluation circuitry 232 may be configured to evaluate the performance of QC or non-QC based code, which may include the generation of code performance information related to the QC or non-QC based code, which may include information related to how code performed on a QC or non-QC based machine (e.g., errors generated, hot-spots, time to run, utilization of QC or non-QC system resources), the QC run costs, the algorithm used by the QC or non-QC based code. In some embodiments, the code performance evaluation circuitry 254 may identify a hotspot type associated with the code.

The machine learning circuitry 252 includes hardware components designed or configured to request, receive, process, generate, and transmit data, data structures, control signals, and electronic information for utilizing one or more machine learning models to evaluate code and algorithms, such as by evaluating performance information, including algorithm performance information and code performance information. The machine learning circuitry 252 may further receive optimization factor data and human input that may be used to evaluate code and algorithms.

The data storage circuitry 256 includes hardware components designed or configured to request, receive, process, generate, store, and transmit data, data structures, control signals, and electronic information for use in PQC. In some embodiments, the data storage circuitry 256 may be configured to store data (e.g., unencrypted data, encrypted data, decrypted data, re-encrypted data, double encrypted data, data access control information, bitstreams of data, links or pointers thereto), data attributes, data envelopes, enveloped data structures, policy information, non-QC algorithms, non-QC algorithm performance information, non-PQC encryption attributes, QC algorithm performance information, QC algorithms, any other suitable data or electronic information, or combinations thereof in a data storage device, a database management system, any other suitable storage device or system, or any combination thereof.

For example, the data storage circuitry 256 may be configured to store an enveloped data structure in a data storage device, a database management system, or a combination thereof. In some embodiments, the data storage circuitry 256 may be configured to store the data, data structures, control signals, and electronic information in the data storage device, the database management system, or both in real-time and without user interactivity.

In some embodiments, the data storage device may comprise, or be implemented as, memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, the database management system may comprise, or be implemented as, a database management system (DBMS), such as a relational DMBS (RDBMS) data warehouse, a first non-relational DBMS (e.g., Hadoop distributed file system (HDFS), Hbase), a second non-relational DBMS (e.g., content management systems), a data visualization device, a data mart (e.g., online analytical processing (OLAP) cube), a real-time analytical RDBMS, any other suitable device or circuitry, or a combination thereof. In some embodiments, the data storage device, the database management system, or both may comprise, or be implemented as, one or more decentralized storage devices, such as a cloud storage device or system.

The UI circuitry 258 includes hardware components designed or configured to generate graphical user interface (GUI) data configured to be displayed by a display device. For instance, the UI circuitry 258 may include hardware components designed or configured to generate GUI data based on any embodiment or combination of embodiments. In some embodiments, the UI circuitry 258 may be configured to generate GUI data and transmit the generated GUI data to the input-output circuitry 206, and the input-output circuitry 206 may be configured to receive the GUI data and display the received GUI data on one or more display screens.

It should also be appreciated that, in some embodiments, each of the data attribute generation circuitry 214, data envelope generation circuitry 216, code testing circuitry 218, data monitoring circuitry 220, data access monitoring circuitry 222, data zone monitoring circuitry 224, optimization factor filtering circuitry 226, QC optimization circuitry 228, code identification circuitry 230, algorithm performance circuitry 232, algorithm selection circuitry 234, machine learning circuitry 252, code performance evaluation circuitry 254, data storage circuitry 256, and UI circuitry 258, may include one or more separate processors, specially configured field programmable gate array (FPGA), ASIC, or cloud utilities to perform the above functions.

In some embodiments, the hardware components described above with reference to data attribute generation circuitry 214, data envelope generation circuitry 216, code testing circuitry 218, data monitoring circuitry 220, data access monitoring circuitry 222, data zone monitoring circuitry 224, optimization factor filtering circuitry 226, QC optimization circuitry 228, code identification circuitry 230, algorithm performance circuitry 232, algorithm selection circuitry 234, machine learning circuitry 252, code performance evaluation circuitry 254, data storage circuitry 256, and UI circuitry 258, may, for instance, communications circuitry 208, or any suitable wired or wireless communications path to communicate with a node device, a server device (e.g., one or more of server devices 110A-110N), a client device (e.g., one or more of client devices 112A-112N), a database server device (e.g., one or more of database server devices 114), a remote server device (e.g., one or more of remote server devices 116), processing circuitry 202, memory 204, input-output circuitry 206, or any other suitable circuitry or device.

In some embodiments, one or more of the data attribute generation circuitry 214, data envelope generation circuitry 216, code testing circuitry 218, data monitoring circuitry 220, data access monitoring circuitry 222, data zone monitoring circuitry 224, optimization factor filtering circuitry 226, QC optimization circuitry 228, code identification circuitry 230, algorithm performance circuitry 232, algorithm selection circuitry 234, machine learning circuitry 252, code performance evaluation circuitry 254, data storage circuitry 256, and UI circuitry 258 may be hosted locally by the apparatus 200.

In some embodiments, one or more of the data attribute generation circuitry 214, data envelope generation circuitry 216, code testing circuitry 218, data monitoring circuitry 220, data access monitoring circuitry 222, data zone monitoring circuitry 224, optimization factor filtering circuitry 226, QC optimization circuitry 228, code identification circuitry 230, algorithm performance circuitry 232, algorithm selection circuitry 234, machine learning circuitry 252, code performance evaluation circuitry 254, data storage circuitry 256, and UI circuitry 258 may be hosted remotely (e.g., by one or more cloud servers) and thus need not physically reside on the apparatus 200. Thus, some or all of the functionality described herein may be provided by a third-party circuitry. For example, the apparatus 200 may access one or more third-party circuitries via a networked connection configured to transmit and receive data and electronic information between the apparatus 200 and the third-party circuitries. In turn, the apparatus 200 may be in remote communication with one or more of data attribute generation circuitry 214, data envelope generation circuitry 216, code testing circuitry 218, data monitoring circuitry 220, data access monitoring circuitry 222, data zone monitoring circuitry 224, optimization factor filtering circuitry 226, QC optimization circuitry 228, code identification circuitry 230, algorithm performance circuitry 232, algorithm selection circuitry 234, machine learning circuitry 252, code performance evaluation circuitry 254, data storage circuitry 256, and UI circuitry 258.

Although some of these components of apparatus 200 are described with respect to their functional capabilities, it should be understood that the particular implementations necessarily include the use of particular hardware to implement such functional capabilities. It should also be understood that certain of these components may include similar or common hardware. For example, two sets of circuitries may both leverage use of the same processor, network interface, quantum communications interface, optoelectronic components, storage medium, machine learning circuitry, or the like to perform their associated functions, such that duplicate hardware is not required for each set of circuitries. It should also be appreciated that, in some embodiments, one or more of these components may include a separate processor, specially configured FPGA, ASIC, or cloud utility to perform its corresponding functions as described herein.

The use of the term "circuitry" as used herein with respect to components of apparatus 200 includes particular hardware configured to perform the functions associated with respective circuitry described herein. While the term "circuitry" should be understood broadly to include hardware, in some embodiments, circuitry may also include software for configuring the hardware. For example, in some embodiments, "circuitry" may include processing circuitry, storage media, network interfaces, quantum interfaces, input-output devices, optoelectronic components, and other components. In some embodiments, other elements of apparatus 200 may provide or supplement the functionality of particular circuitry. For example, the processing circuitry 202 may provide processing functionality, memory 204 may provide storage functionality, classical communications circuitry 210 may provide network interface functionality, and quantum communications circuitry 212 may provide quantum interface functionality among other features.

In some embodiments, various components of one or more of the apparatus 200 may be hosted remotely (e.g., by one or more cloud servers) and thus need not physically reside on the corresponding apparatus 200. Thus, some or all of the functionality described herein may be provided by third-party circuitry. For example, an apparatus 200 may access one or more third-party circuitries via any sort of networked connection that facilitates transmission of data and electronic information between the apparatus 200 and the third-party circuitries. In turn, that apparatus 200 may be in remote communication with one or more of the other components described above as being comprised by the apparatus 200.

As will be appreciated, computer program instructions and/or other type of code may be loaded onto a computer, processor or other programmable apparatus's circuitry to produce a machine, such that the computer, processor, or other programmable circuitry that executes the code on the machine creates the means for implementing various functions described herein.

As described above and as will be appreciated based on this disclosure, embodiments of the present disclosure may be configured as systems, apparatuses, methods, optoelectronic devices, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer-executable program code instructions, any other type of code described herein, and any combination thereof may be loaded onto a computer, processor or other programmable apparatus's circuitry to produce a machine, such that the computer, processor, or other programmable circuitry that executes the code on the machine creates the means for implementing various functions, including the functions described herein.

The one or more server devices 110A-110N, one or more client devices 112A-112N, one or more database server devices 114, and one or more remote server devices 116 described with reference to FIG. 1 may be embodied by one or more computing devices, servers, data storage devices, or systems that also may include processing circuitry, memory, input-output circuitry, and communications circuitry. For example, a server device 110 may be a database server on which computer code (e.g., C, C++, C#, java, a structured query language (SQL), a data query language (DQL), a data definition language (DDL), a data control language (DCL), a data manipulation language (DML)) is running or otherwise being executed by processing circuitry. In another example, a client device 112 may be a smartphone on which an app (e.g., a mobile database app) is running or otherwise being executed by processing circuitry. As it relates to operations described in the present disclosure, the functioning of these devices may utilize components similar to the similarly named components described above with reference to FIG. 2. Additional description of the mechanics of these components is omitted for the sake of brevity. These device elements, operating together, provide the respective computing systems with the functionality necessary to facilitate the communication of data with the PQC system described herein.

Having described specific components of example devices and circuitries involved in various embodiments contemplated herein, example procedures for QC based optimization are described below in connection with FIGS. 3-7.

FIGS. 3 and 5-7 illustrates an example flowcharts 300 that contain operations for generating a determination in accordance with some example embodiments described herein. The operations illustrated in FIGS. 3 and 5-7 may, for example, be performed by one or more components described with reference to QC system 102 shown in FIG. 1; by a server device 110, a client device 112, a database server device 114, or a remote server device 116 in communication with QC system 102; by apparatus 200 shown in FIG. 2; or by any combination thereof. In some embodiments, the various operations described in connection with FIG. 3 may be performed by the apparatus 200 by or through the use of one or more of processing circuitry 202, memory 204, input-output circuitry 206, communications circuitry 208 (including, but not limited to, classical communications circuitry 210 and quantum communications circuitry 212), data attribute generation circuitry 214, data envelope generation circuitry 216, code testing circuitry 218, data monitoring circuitry 220 (including, but not limited to, data access monitoring circuitry 222 and data zone monitoring circuitry 224), optimization factor filtering circuitry 226, QC optimization circuitry 228, code identification circuitry 230, algorithm performance circuitry 232, algorithm selection circuitry 234, machine learning circuitry 252, code performance evaluation circuitry 254, data storage circuitry 256, user interface (UI) circuitry 258, any other suitable circuitry, and any combination thereof.

FIGS. 3 and 5-7 illustrates flowcharts describing the operation of various systems (e.g., QC system 102 described with reference to FIG. 1), apparatuses (e.g., apparatus 200 described with reference to FIG. 2,), methods (e.g., flowchart 300 described with reference to FIG. 3), and computer program products according to example embodiments contemplated herein. It will be understood that each operation of the flowcharts, and combinations of operations in the flowcharts, may be implemented by various means, such as hardware, firmware, processor, circuitry, and/or other devices associated with execution of software including one or more computer program instructions. For example, one or more of the procedures described herein may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIGS. 3 and 5-7 support combinations of means for performing the specified functions and combinations of operations for performing the specified functions. It will be understood that one or more operations of the flowcharts, and combinations of operations in the flowcharts, may be implemented by special purpose hardware-based computer systems which perform the specified functions, or combinations of special purpose hardware and computer instructions.

Portfolio Optimization

Figure 3:
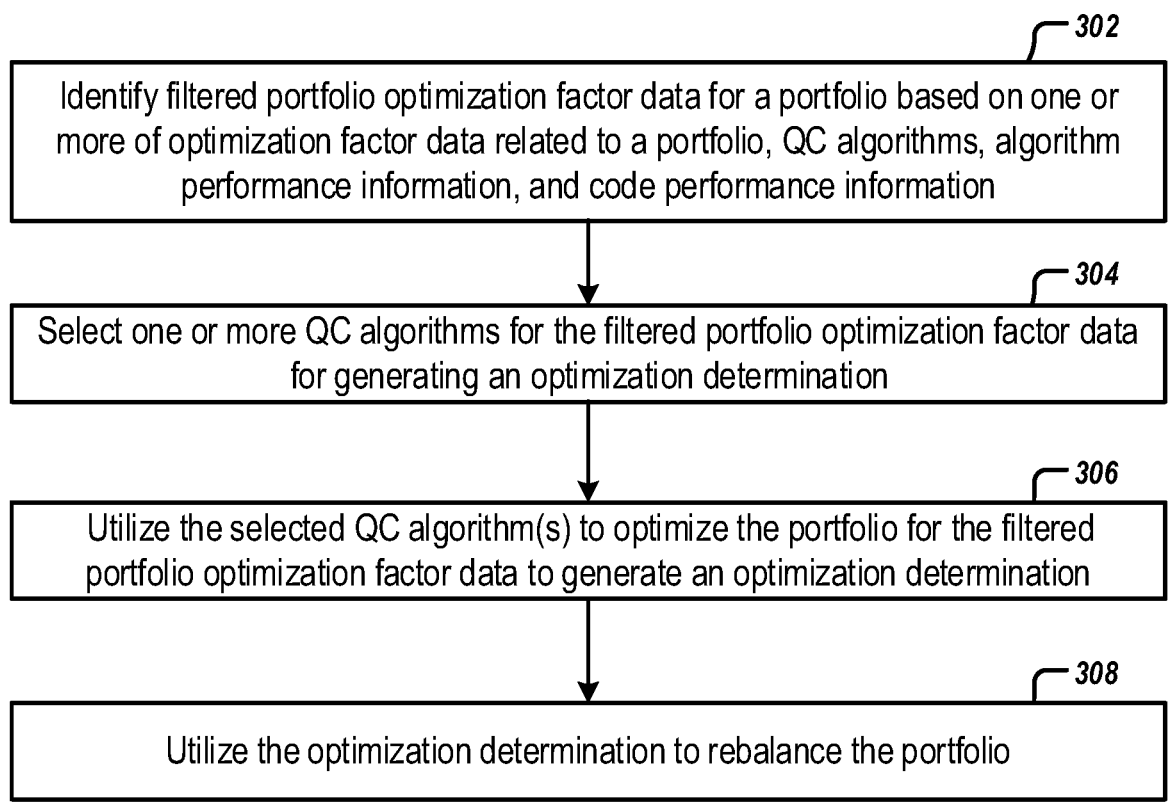
FIG. 3 illustrates an example of a flowchart for optimizing an optimization determination based on QC algorithms in accordance with some example embodiments described herein.

FIG. 3 is a flowchart showing exemplary operations for optimizing an optimization determination based on QC algorithms in accordance with some example embodiments described herein. A portfolio of assets may be optimized for a plurality of factors, such as for a given risk level, which may be for a given period of time. A period of time may be hours, days, weeks, months, or years. A period of time may, or may not, relate to ages, life events, career events (e.g., retirement), and/or exogenous events. A risk level may be based on a scale of how risky an asset is considered, such as a ranking of one to ten, where a rank of one may represent a low risk asset such as cash and ten may rank as a high-risk asset such as options. Additionally, or alternatively, risk may be based on desired value of the portfolio at the end of a period of time in view of a historic and/or forecasted rate of growth. Additionally, or alternatively, a portfolio may be compared to a benchmark, which may be for returns and/or risk, which may allow for a determination if the desired risk is more or less risky than the benchmark.

Additionally, or alternatively, a portfolio may be optimized based on factors related to optimization factor data, such as a portfolio owner's constraints, preferences and/or life events. Additionally, or alternatively, a portfolio may be optimized based on events external to the customer, such as local events, national events, and/or world events. Additionally, or alternatively, a portfolio may be personalized to create a personalized portfolio by the portfolio owner choosing constraints and/or preferences for the portfolio, which may include the portfolio providing feedback about or specifying choices or values for some of the optimization factors. Additionally, or alternatively, the feedback may be related to questions posed to the portfolio owner, the feedback on which may specify scenarios, risks, returns, or time periods. The optimization of the portfolio may provide for the portfolio to achieve the portfolio owner's constraints and/or preference, which may be to maximize growth, minimize volatility, attain a value, minimize risk, and/or a combination these goals. Constraints and/or preference may change over time, such as with a portfolio owner reach certain life events, such as graduating school, obtaining a job, getting married, having children, caring for others, and/or retirement. Constraints and/or preferences may also change based on a nonlife events and may include owning assets or not owning assets associated with a specified location, owning assets or not owning assets at certain times, owning assets or not owning assets associated with a specified industry or industries, owning assets or not owning assets related to specified products, and/or owning assets or not owning assets related to entities, organizations, and/or businesses.

In some embodiments, a portfolio may include plurality of types of assets. The type of assets may change over time, such as in response to changes in risk level, constraints, preferences, life events, or external events. Such changes may require rebalancing a portfolio, which may be done to optimize the portfolio.

Optimizing the portfolio may require analysis of a plurality of optimization factors that depend on the assets of the portfolio. Depending on the optimization factors associated with the portfolio's assets, optimizing the portfolio may include forecasting risk and returns associated with each asset, which may include how the risk of assets in the portfolio relate to each other.

Optimization may be performed with QC algorithms. In some example embodiments, the QC algorithms to optimize may include algorithms to determine the performance of an asset, determine the performance of the portfolio, and/or determine how assets in the portfolio relate to each other to achieve an optimization. These QC algorithms for each asset of the portfolio may be the same or they may be different. Additionally, or alternatively, the QC algorithm to be used may be selected based on, among other things, optimization factors, including a selected time period, risk level, portfolio owner's constraints, portfolio owner's preferences, portfolio owner's life events, and/or external events.

In an embodiment, a first portfolio may include only stocks, which may lead to a selection of a first QC algorithm that provides better performance in optimizing stocks based on the optimization factors related to stocks.

In another embodiment, a second portfolio may include commodities, which may lead to a selection of a second QC algorithm that provides better performance in optimizing commodities based on the optimization factors related to commodities.

In another embodiment, a third portfolio may include stocks and commodities and may lead to the selection of a first QC algorithm that provides better performance in optimizing stocks and a second QC algorithm that provides better performance in optimizing commodities, which may include each QC algorithm providing better performance based on the optimization factors associated with, respectively, stocks and commodities.

In another embodiment, a fourth portfolio may include only stocks and a time period may be selected that allows for some factors that would otherwise be relevant to an optimization to be omitted, which may lead to the selection of a fourth QC algorithm that provides better performance in optimizing stocks based on the optimization factors associated with optimizing the portfolio for the time period selected.

In another embodiment, a fifth portfolio may include only stocks and a risk level may be selected that allows for some factors that would otherwise be relevant an optimization to be omitted, which may lead to the selection of a fifth QC algorithm that provides better performance in optimizing stocks based on the optimization factors associated with optimizing the portfolio for the risk level selected.

In an embodiment, performance information for an algorithm may be used and/or tracked for the selection of a QC algorithm or, alternatively, of the selection of an alternative QC algorithm to perform an optimization, which may be based on how either of the QC algorithms previously performed, how either of the QC algorithms performed in testing, performance when varying QC system resources are available, performance of QC run costs, and/or performance for variations of code running the QC algorithm.

Returning to the operations of FIG. 3, as shown by operation 302, the apparatus 200 includes means, such as code identification circuitry 230 or the like, for identifying filtered portfolio optimization factor data based on one or more of optimization factor data, QC algorithms, algorithm performance information, and code performance information.

The one or more QC algorithms may be one or more of, for example, Quadratic Unconstrained Binary Optimization "QUBO", Quantum Approximate Optimization Algorithm "QAOA", Quantum Machine Learning "QML", Quantum Geometrodynamics "QGD", Quantum Monte Carlo "QMC", Harrow, Hassidim and Lloyd "HHL", or the like, executed on a particular QC machine (e.g., quantum annealer, circuit-based quantum processor, or the like).

As shown by operation 304, the apparatus 200 includes means, such as algorithm selection circuitry 234 or the like, for selecting one or more QC algorithms for the filtered portfolio optimization factor data. In some embodiments, the algorithm selection circuitry 234 may receive results of comparing the filtered portfolio optimization factor data with performance of one or more QC algorithms and/or performance of code, and a QC algorithm will be selected accordingly.

As shown by operation 306, the apparatus 200 includes means, such as QC optimization circuitry 228, for utilizing the selected QC algorithm(s) to optimize the portfolio for the filtered portfolio optimization factor data to generate an optimization determination. An optimization determination will provide what was determined may be done to optimize the portfolio, which may include any assumptions, forecasts, models, or factor data utilized by the QC algorithm in generating the determination.

As shown by operation 308, the apparatus 200 includes means, such as QC optimization circuitry 228 in conjunction with communications circuitry 208, for rebalancing the portfolio according to the optimization determination. The apparatus 200 may cause order to be generated and sent that may buy and/or sell assets in order to rebalance the portfolio. The buying and/or selling of assets may change the assets, the quantity of assets, and/or the type of assets in the portfolio to optimize the portfolio in accordance with the portfolio optimization determination.

In another embodiment, the apparatus 200, such as with QC optimization circuitry 228, may generate more than one optimization determination based on the selected QC algorithms and the filtered portfolio optimization data, with each of the optimization determinations satisfying a desired optimization factor, such as given risk level, while also satisfying another optimization factor, such as a level of return. The multiple optimization determinations may, for example, differ in their impact to the portfolio in regard to another optimization factor, such as differing in assets that may have different tax consequences.

The portfolio optimization determination may indicate that the portfolio already has the optimal allocation of assets for a plurality of factors, such as for a given risk level, which may be for a given period of time. Alternatively, the portfolio optimization determination may indicate that the portfolio is not optimized, and a portfolio owner may be alerted to this portfolio optimization determination and/or the portfolio may be rebalanced. Additionally, or alternatively, if the portfolio is determined to not be optimized, the portfolio optimization determination may include what is required to optimize the portfolio based on a time period selected, a risk level, the portfolio owner's constraints, the portfolio owner's preference, life events and/or external events.

In some embodiments, the portfolio owner will be alerted of the portfolio optimization determination and provide input results in the portfolio being rebalanced. In other embodiments, a portfolio optimization determination may trigger the portfolio being rebalanced. In some embodiments, a portfolio owner may set a preference if an alert should be provided or if the portfolio should be rebalanced prior to the portfolio owner receiving an alert or if not alert should be sent.

Portfolio Optimization for an Efficient Frontier

Figure 4:
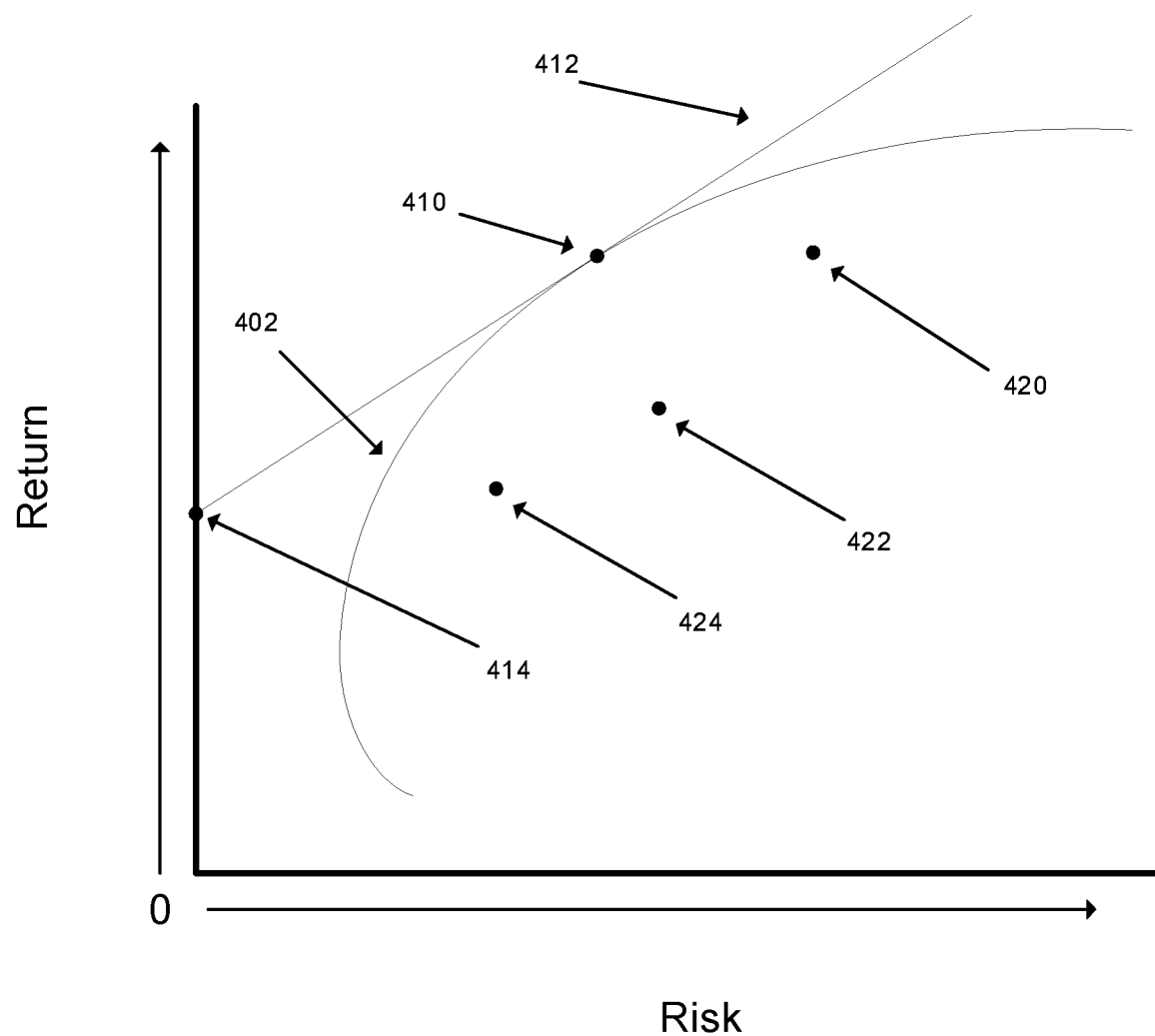
FIG. 4 illustrates an example of an efficient frontier in accordance with some example embodiments described herein.
Figure 5:
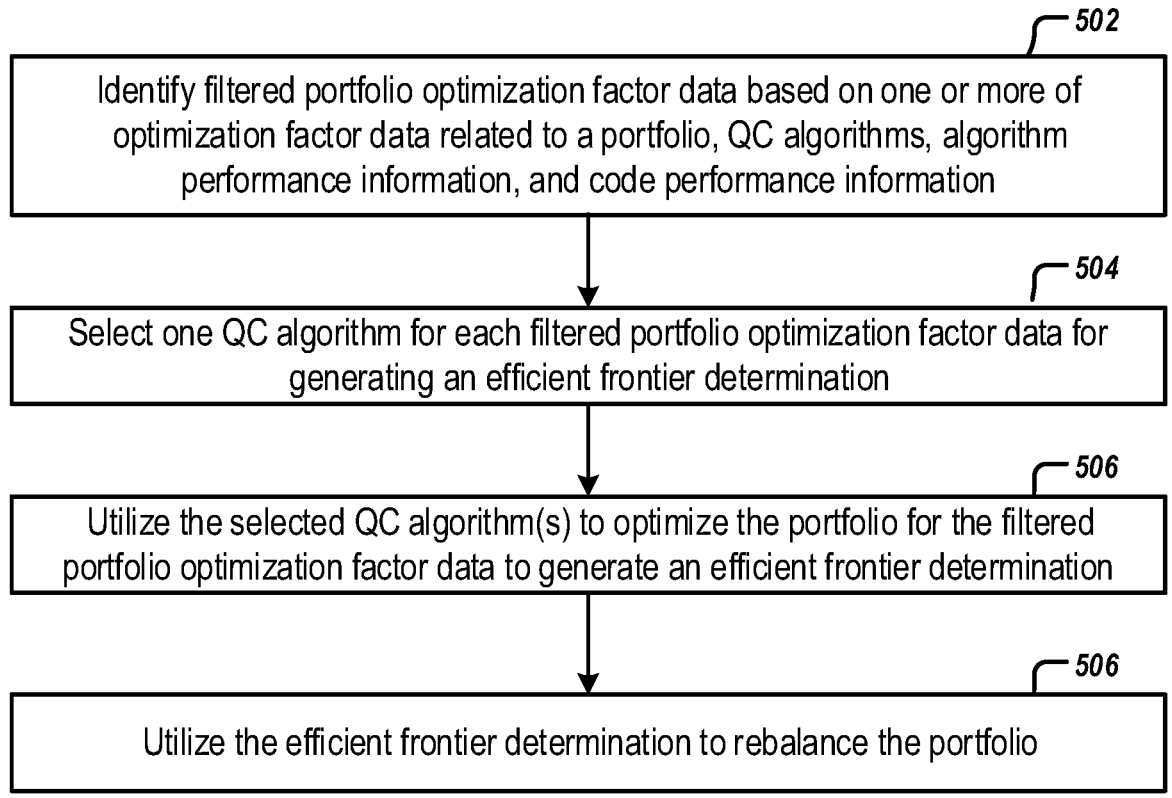
FIG. 5 illustrates an example of a flowchart for an efficient frontier determination based on QC algorithms in accordance with some example embodiments described herein.

FIG. 4 illustrates an example of an efficient frontier in accordance with some example embodiments described herein and FIG. 5 is a flowchart showing exemplary operations for utilizing an efficient frontier to rebalance a portfolio of assets in accordance with some example embodiments described herein. A portfolio of assets may be optimized to an efficient frontier. An efficient frontier is measured as a return for a particular level of risk, where the risk may be represented as a standard deviation. A return of the portfolio is dependent on the assets that are in the portfolio, including the quantity of each asset in the portfolio. Portfolios that are not on the efficient frontier may be referred to as sub-optimal because they either do not provide enough return for a level of risk, or have too much risk for a level of return, or both. As a portfolio owner select a given level of return or a given level of risk, the portfolio owner may not be on the efficient frontier for the portfolio and the portfolio may need to be rebalanced.

As stated above, FIG. 4 illustrates an example of an efficient frontier in accordance with some example embodiments described herein. In FIG. 4, an efficient frontier 402 is an optimal amount of return for a level of risk. For example, portfolio 410 is on the efficient frontier and has an optimal amount of return for the amount of risk associated with the assets in portfolio 410, which may be referred to as an optimal risky portfolio. The point where the efficient frontier 402 intersects with a capital market line 412 may be where portfolio 410 has an optimal amount of return for the amount of risk. The capital market line 412 may be determined based on a risk free rate 414, and the risk free rate may not be constant. For example, the risk free rate may be specific to a particular efficient frontier, including, but not limited to, being specific to an asset, a portfolio, or a company. In contrast, and as illustrated in FIG. 4, asset 420, asset 422, and asset 424 may each be sub-optimal in that each, for the level of risk, may achieve a sub-optimal return. An efficient frontier may be obtained by optimizing an efficient frontier determination regarding an optimal portfolio, including the quantity of each asset in the portfolio (e.g., number of shares of stock, number of bonds, etc.) for a specific amount of risk. In some embodiments, reference numbers 420, 422, and 424 may not be individual assets but instead may be include, but are not limited to, portfolios or other groupings of assets.

In FIG. 5, as shown by operation 502, the apparatus 200 includes means, such as code identification circuitry 230 or the like, for identifying filtered portfolio optimization factor data based on one or more of optimization factor data, QC algorithms, algorithm performance information, and code performance information.

The one or more QC algorithms may be one or more of, for example, Quadratic Unconstrained Binary Optimization "QUBO", Quantum Approximate Optimization Algorithm "QAOA", Quantum Machine Learning "QML", Quantum Geometrodynamics "QGD", Quantum Monte Carlo "QMC", Harrow, Hassidim and Lloyd "HHL", or the like, executed on a particular QC machine (e.g., quantum annealer, circuit-based quantum processor, or the like). The QC algorithm may depend on the hardware and/or software of quantum computing system 102. In one embodiment, the hardware and/or software may include an annealer or a circuit bases universal gate model, and the QC algorithm may depend on such hardware and/or software.

As shown by operation 504, the apparatus 200 includes means, such as algorithm selection circuitry 234 or the like, for selecting one or more QC algorithms for the filtered portfolio optimization factor data. In some embodiments, the algorithm selection circuitry 234 may receive results of comparing the filtered portfolio optimization factor data with performance of one or more QC algorithms and/or performance of code, and a QC algorithm will be selected accordingly.

As shown by operation 506, the apparatus 200 includes means, such as QC optimization circuitry 228, for utilizing the selected QC algorithm(s) to optimize the portfolio for the filtered portfolio optimization factor data to generate an efficient frontier determination. An efficient frontier determination will provide what was determined to be the portfolio for achieving optimal returns at a particular risk level based on the assets at a particular risk level, which may include any assumptions, forecasts, models, or factor data utilized by the QC algorithm in generating the determination.

As shown by operation 508, the apparatus 200 includes means, such as QC optimization circuitry 228 in conjunction with communications circuitry 208, for rebalancing the portfolio according to the efficient frontier determination. The apparatus 200 may cause order to be generated and sent that may buy and/or sell assets in order to rebalance the portfolio. The buying and/or selling of assets may change the assets, the quantity of assets, and/or the type of assets in the portfolio to optimize the portfolio in accordance with the efficient frontier determination.

Tracking Error

Figure 6:
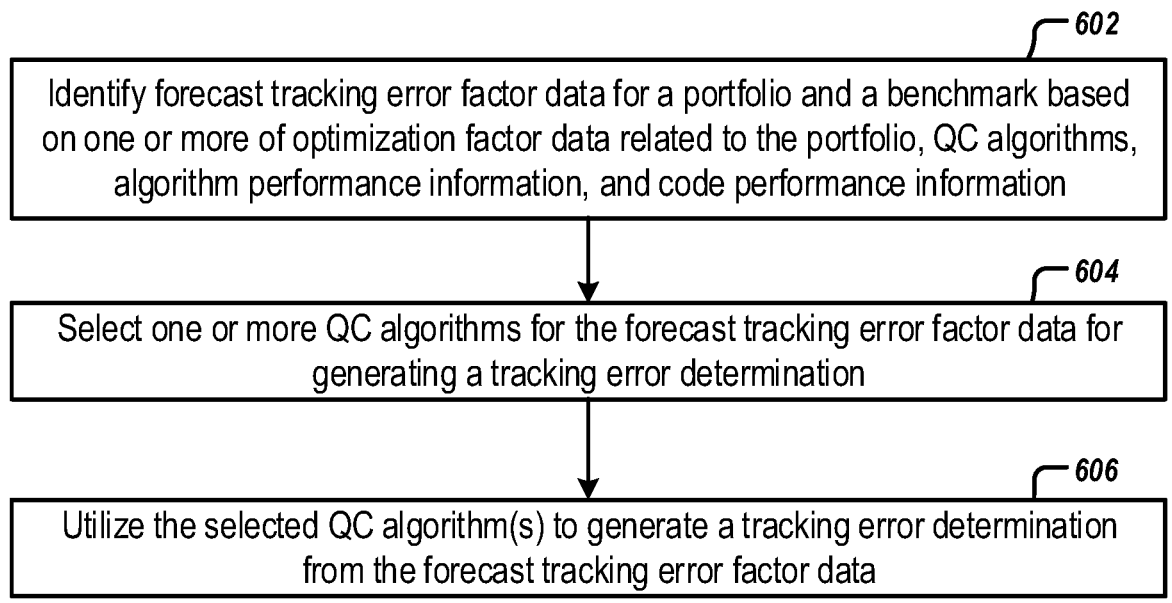
FIG. 6 illustrates an example of a flowchart for a tracking error determination based on QC algorithms in accordance with some example embodiments described herein.

FIG. 6 is a flowchart showing exemplary operations for optimizing a tracking error determination based on QC algorithms in accordance with some example embodiments described herein A portfolio may attempt to track a benchmark, and the difference between the performance of the portfolio to the performance of the benchmark may be determined by the tracking error. A portfolio may be a single asset or it may be a bundle of assets. The tracking error is the divergence between, for example, the price or returns of a portfolio and the price or returns of a benchmark. Tracking error may be reported as a standard deviation percentage difference between a portfolio and a benchmark, which reports the difference between the return received by the portfolio and that of the benchmark.

A benchmark may a single asset, a bundle of assets, or an index. In one embodiment, the benchmark may a stock market index, such as the Dow Jones Industrial Average, the NASDAQ Composite Index, the S&P 500 Index, or the Russell 2000 Index. In another embodiment, the benchmark may be a multiple of an index or another portfolio, such as two times the S&P 500 Index or minus one times the S&P Index. In another embodiment, the benchmark may be the value of an asset, such as the value of a house or value or a piece of art. In another embodiment, the benchmark may be the value of another's portfolio or of another's assets. In another embodiment, the benchmark may be another's investments, such as the investments of a company or professional investor. In one embodiment, a portfolio may be a mutual fund that seeks to benchmark the performance of the S&P 500 Index, and the portfolio may include the same stocks as included in the S&P 500 Index or it may include different stocks from the S&P 500 Index. Additionally, or alternatively, a portfolio may include different amounts or weightings of assets than the benchmark it is tracking.

A tracking error may be determined over a historical period of time. A tracking error for a historical period of time may define the time period and then, based on the performance of the portfolio and the performance of the benchmark over that time period, determine the tracking error.

A tracking error may be determined for a forecast of a portfolio and a forecast of a benchmark. The forecast for the portfolio may be forecasted separately or together with the forecast for the benchmark. A forecast may be determined by selecting a period of time and then evaluating how, for example, a portfolio or a benchmark may change over the selected period of time. How a portfolio or a benchmark may change depends on what type of assets makes up the portfolio or benchmark. In one embodiment, the asset or assets that make up the portfolio or the benchmark may be the same type of assets, may share some types of assets, or may not share any types of assets.

In an embodiment with the portfolio and benchmark being of the same types of assets, the factors used to determine a forecast of the portfolio and the forecast of the benchmark may use the same. In another embodiment with the portfolio and benchmark may share some but not all types of assets, the factors used to determine each forecast may be the same or similar for determining a forecast of one asset and may be different for determining a forecast of another asset. In an embodiment with the portfolio and benchmark may not share any types of assets, the factors used to determine each forecast be different.

A portfolio may include a plurality of different assets, and the quantity of factors used to determine a forecast for the portfolio may vary. In one embodiment, a portfolio may contain stocks. In another embodiment, a portfolio may contain stocks and bonds. In another embodiment, a portfolio may contain stock, bonds, cash, and options. In another embodiment, a portfolio may contain stock, bonds, cash, and commodities. In one embodiment, a forecast of a stock may include factors related to earnings, interest rates, default risk, dividends, stock buybacks, tax rates, and/or government approvals, among others. In another embodiment, a forecast of a commodity may include factors related to interest rates, tax rates, weather patterns, supply of the commodity, demand of the commodity, cost to produce the commodity, geopolitical risk associated with the commodity, public sentiment, and/or governmental approvals, among others. Additionally, for a selected time period for the forecast, some of the factor may change over the time period while others may stay the same. In an embodiment, if a factor stays the same, the forecast may omit the factor.

The determination of the forecast tracking error may be determined by QC algorithms. In an embodiment, the QC algorithms to determine the forecast tracking error may include QC algorithms to determine the forecast of the portfolio, determine the forecast of the benchmark, and/or determine the forecast tracking error. These QC algorithms may be the same or they may be different, which may depend on the assets in the portfolio and the benchmark. The QC algorithm to be used may be selected based on, among other things, the portfolio or the benchmark. For example, a QC algorithm to forecast the returns of a stock, which may address factors related to the stock (e.g., earnings, interest rates, default risk, dividends, stock buybacks, tax rates, and/or government approvals, etc.) may be different from a QC algorithm to forecast the returns for a commodity, which may address factors related to the commodity (e.g., interest rates, tax rates, weather patterns, supply of the commodity, demand of the commodity, cost to produce the commodity, geopolitical risk associated with the commodity, public sentiment, and/or governmental approvals). The resources required to run these QC algorithms, such as the QC run cost, may also differ, including different due to the number and type of factors evaluated by the QC algorithm.

In an embodiment, performance information for an algorithm may be used and/or tracked for the selection of a QC algorithm or, alternatively, of the selection of an alternative QC algorithm to perform an optimization, which may be based on how either of the QC algorithms previously performed, how either of the QC algorithms performed in testing, QC system resources available, QC run costs, and/or code running the QC algorithm.

In FIG. 6, as shown by operation 602, the apparatus 200 includes means, such as code identification circuitry 230 or the like, for identifying tracking error factor data for a portfolio and a benchmark based on one or more of optimization factor data, QC algorithms, algorithm performance information, and code performance information.

The one or more QC algorithms may be one or more of, for example, Quadratic Unconstrained Binary Optimization "QUBO", Quantum Approximate Optimization Algorithm "QAOA", Quantum Machine Learning "QML", Quantum Geometrodynamics "QGD", Quantum Monte Carlo "QMC", Harrow, Hassidim and Lloyd "HHL", or the like, executed on a particular QC machine (e.g., quantum annealer, circuit-based quantum processor, or the like).

As shown by operation 604, the apparatus 200 includes means, such as algorithm selection circuitry 234 or the like, for selecting one or more QC algorithms for the forecast tracking error factor data for generating a tracking error determination. In some embodiments, the algorithm selection circuitry 234 may receive results of comparing the forecast tracking error factor data with performance of one or more QC algorithms and/or performance of code, and a QC algorithm will be selected accordingly.

As shown by operation 606, the apparatus 200 includes means, such as QC optimization circuitry 228, for utilizing the selected QC algorithm(s) to generate a tracking error determination form the forecast tracking error factor data. A tracking error determination will provide what was determined may be the tracking error along with what may have been determined to have created the error, which may include any assumptions, forecasts, models, or factor data utilized by the QC algorithm in generating the determination. For an example of a portfolio of stocks and a benchmark of a stock index, a tracking error may have been determined because a portfolio or, alternatively, a benchmark may have distributed dividends or undergone share buyback when the other did not. In another example, involving a portfolio of real estate investment trusts and a benchmark of real estate, either the portfolio may have had dividends while the real estate did not or the real estate may have been impacted by a natural disaster while the portfolio was not.

In some embodiments, a tracking error or a forecast tracking error may be determined in real-time or, alternatively, the tracking error may be determined on a periodic basis (e.g., market open, market close, every hour, or every night). Additionally, or alternatively, a tracking error or forecast tracking error may be determined if a factor associated with the portfolio moves in relation to a threshold or a range, which may or may not be in relation to a previous value (e.g., a factor change in price of 2% since market open). In some embodiments, a tracking error greater than a threshold or outside of a range may result in a rebalancing of the portfolio, which is described herein. In some embodiments, a tracking error greater than a threshold or outside of a range may generate an alert, which is described herein.

Stress Testing

Figure 7:
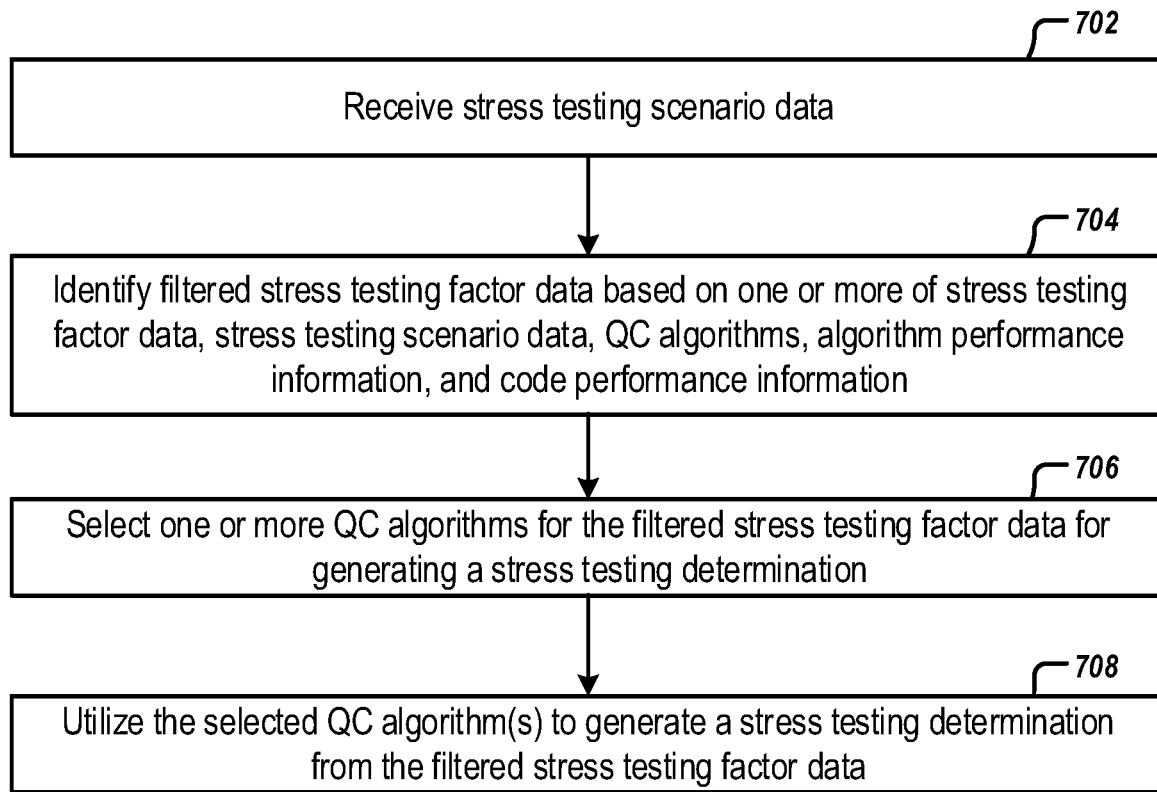
FIG. 7 illustrates an example flowchart for a stress testing determination based on QC algorithms in accordance with some example embodiments described herein.

FIG. 7 is a flowchart showing exemplary operations for performing a stress testing determination based on QC algorithms in accordance with some example embodiments described herein Stress testing may be performed on an asset, a portfolio (e.g., a portfolio of a customer, a portfolio within a company, or a portfolio of some (e.g., 25%, 50%, or 75%) or all of other portfolios), or a company, and stress testing may, or may not, be performed during optimization. Stress testing may include multiple scenarios and/or forecasts to evaluate the financial health of an asset, a portfolio, or a company. Stress testing may assess multiple factors, which may include optimization factors. While the stress testing may be described as being associated with a company, the same type of stress testing may be associated with an asset or portfolio.

Stress testing of a company may include the stress testing of assets, liabilities, and/or decisions the company may make about some or all of those assets and/or liabilities. One example of such stress testing is Comprehensive Capital Analysis and Review (CCAR), which involves the evaluation of the internal capital planning processes of large, complex bank holding companies and their proposals to undertake capital actions, such as increasing dividend payments or repurchasing or redeeming stock. Another example of such stress testing is the Dodd-Frank Act Stress Tests (DFAST), which involves the evaluation of the impact on capital levels from immediate financial shocks and for a period of time of adverse economic conditions. A further example of stress testing is Basel III, which involves evaluation of, among of things, capital adequacy and market liquidity.

Guidelines may be issued for mandated types of stress testing and, when stress testing is mandated, reports may be generated from the stress testing to demonstrate the results. CCAR guidelines are issued by the Federal Reserve to test that certain companies hold adequate capital to maintain ready access to funding, continue operations, and meet their obligations to creditors and counterparties, and continue to serve as credit intermediaries, even under adverse conditions. Companies subject to CCAR may submit comprehensive capital plans and additional supervisory information. A comprehensive capital plan may address multiple criteria, including: (1) capital assessment and planning processes; (2) capital distribution policy; (3) plans to repay any government investment; (4) ability to absorb losses under several scenarios; and (5) plans for addressing the expected impact of government legislation. DFAST guidelines are issued by the Federal Housing Finance Agency and Basel III guidelines are issued by the Basel Committee on Banking Supervision of the Bank of International Settlements. Companies subject to DFAST may perform stress testing under multiple scenarios, such as baseline scenarios, adverse scenarios, and severely adverse scenarios to assess the potential impact of economic and financial conditions on earnings, losses, and capital over a period of time. Companies subject to Basel III may perform stress testing under multiple scenarios, which may provide alerts of unexpected adverse outcomes arising from risks and provide indication of the financial resources that might be needed to absorb losses from risks, such as large shocks. While the guidelines for each of CCAR, DFAST, and Basel III are distinct, each is a stress test and the stress testing described below is not limited to only CCAR, DFAST, or Basel III and it is understood that various components may be used for stress testing. Therefore, it is to be understood that the disclosure associated with a particular stress test (e.g., CCAR, DFAST, or Basel III) is not to be limited to the specific embodiments of a stress test.

Stress testing, including but not limited to CCAR testing, may include scenarios to test an ability to absorb unexpected losses and continue to lend, which may be to test for capital adequacy. CCAR testing may demonstrate that large bank holding companies have thorough and robust processes for managing and allocating their capital resources, and that these are supported by effective risk measurement and management practices. Scenarios lasting multiple years may be divided into smaller time periods, such as quarters. Stress testing may also include one or more scenarios of a baseline scenario, an adverse scenario, a severely adverse scenario, a loss estimation scenario, and/or a pre-provision net revenue (PPNR) scenario.

In one embodiment, such as with CCAR testing, the stress testing may assess capital adequacy, including an assessment of the level and composition of capital resources under stressed economic and financial market conditions. Stress testing may encompass both quantitative analysis and qualitative reviews of large bank holding companies' processes for assessing, and strategies for managing, their capital resources, rather than focusing on static comparisons of current capital amounts relative to regulatory minimum requirements, internal management targets, and capital levels at peer institutions.

In other embodiments, the stress testing may assess retail credit risk, wholesale credit risk, available for sale (AFS) securities, hold-to-maturity (HTM) securities, operational risk, market risk, counterparty risk, noninterest income, noninterest expense(s), net interest income, balance sheet projections, risk weight assets (RWA), and/or allowance for loan and lease losses (ALLL). Such assessments may be made by using models and/or approaches, including but not limited to expected loss approach models, rating transition models, vintage loss models, charge-off models, ratings-based approach along with cash flow and credit analysis, historical averages, legal exposures, regression models, modified latent Dirichlet allocation (LDA), probabilistic approach, deterministic approach, volume projections with or without fee and cost rates, pricing models, prepayment rate models, interest rate models, re-pricing rate models, line utilization models, product mix models, balance or volume projection models, component models (origination, prepayment, and/or default), credit loss models, revenue and balance sheet models, production growth models, and/or deposit models. In some embodiments, the stress testing may use scenarios and/or models for different portions of a company (e.g., retail versus wholesale).

Stress testing, including but not limited to CCAR, may include many factors, such as: (1) a description of the current regulatory capital base, including key contractual terms of capital instruments and any management plans to retire, refinance, or replace the capital instruments over the planning horizon; (2) a description of all planned capital actions (e.g., dividends, share repurchases, and issuances), as well as anticipated changes in the company's risk profile, business strategy, or corporate structure over the planning horizon; (3) a description of the bank holding company's processes and policies for determining the size of dividend and common stock repurchase programs under different operating conditions; (4) the company's assessment of potential losses, earnings, and other resources available to absorb such losses under stressed economic and financial market environments, and the resulting impact on a company's capital adequacy and capital needs over the planning horizon; and (5) an assessment, accompanied by supporting analysis, of the capital needed by the company on a post-stress basis to continue operations, meet its obligations, and function as a credit intermediary. The testing may include demonstrating an appropriate internal target level of capital and to take actions consistent with the maintenance of the internal target over time. The stress testing may also involve triggers and specified actions, which may reduce capital distributions under adverse conditions. Stress testing may include varying some or all of these factors and/or testing scenarios where, for example, constrains may be breached, processes are followed (or not), and/or other factors are varied.

Stress testing, including but not limited to CCAR, may assess additional factors related to a company's comprehensive capital plans: (1) Capital Adequacy Processes (CAP) assessment—determine and evaluate if processes for planning, managing, and allocating capital resources and for assessing whether capital is adequate to withstand a stressful economic environment, and if those processes are supported by adequate company-wide risk management and measurement practices; (2) capital distribution policy—determine and evaluate if policies and processes governing dividends, repurchases, and any other distributions in view of considerations of the company's future performance; (3) government investment repayment—determine and evaluate plans will result in the repayment of any government investment before beginning or increasing capital distributions to common shareholders; (4) stress scenario analysis—determine and evaluate if sufficient capital, incorporating all proposed capital actions, is had to remain viable and healthy even under a stressful economic environment; and (5) government legislation—determine and evaluate if plans may meet regulatory requirements. The assessment may include whether dividend and repurchase policies enumerate quantitative and qualitative criteria for promptly reconsidering capital distributions in the event of a deteriorating operating environment or economic outlook. Stress testing may evaluate how judgments on distributions were informed and were expected to differ under baseline projections and more adverse conditions. Stress testing factors may include optimization factors related to an asset. Stress testing may evaluate risk management capabilities, supporting supervisory activities (e.g., inspections), and/or risk profiles.

Quarterly forecasts or projections may include revenues, losses, and pro forma capital positions over a quarterly under different scenarios. The stress test may determine quarterly projections of a company's regulatory capital ratios, such as Tier 1 ratio, total capital ratio, and leverage ratio as well as a Tier 1 common ratio. As a part of the plans to be evaluated, it may be required to specify, by quarter, all planned capital actions, including dividend payments, common share repurchases, conversions, and issuance, as well as expected changes in the company's risk profile, business strategy, or corporate structure over the planning horizon.

Multiple scenarios may also be used to determine how a company performs for each scenario, which may involve varying multiple factors. In some embodiments, there may be three scenarios that include (1) a baseline scenario reflecting expectations of the most likely path of the economy; (2) a stress scenario to stress key sources of revenue and the most vulnerable sources of loss; and (3) an adverse "supervisory stress scenario" that may be generated by another, such as the Federal Reserve. The scenarios may represent a recession, with negative economic growth for at least a couple of quarters, a rise in unemployment, and/or a sharp drop in risky asset prices. The scenarios may cover the time period(s) tested and may, or may not, include additional time periods. The scenarios may include factors representing, for example, a real GDP, unemployment rate, notional house price index, and/or equity price index. The scenarios may specify different value for each of the factors over the duration of the scenarios, and these factors may change or may stay the same. Scenarios may also include estimates of potential losses stemming from trading activities and private equity investments using a scenario that differs from the, for example, three scenarios. The testing may include estimated potential mark-to-market and default-related losses on trading and private equity positions and from exposures to trading and financing transaction counterparties. Stress testing may involve providing detailed information about loan and securities portfolios, the trading portfolio and its sensitivity to different market risk factors, and factors affecting future revenue-generating ability. The stress testing may also be used to develop and calibrate loss estimation/revenue models for different types of loans and securities, including being based on processes and empirical approaches to projecting losses, revenues, and other key components affecting capital over the tested time period. Stress testing scenarios may also include varying models used to test for, for example, pro forma capital ratios and/or balance sheet models.

Stress testing, such as CCAR testing, may also include developing strategies, projections, and/or testing scenarios regarding reducing or increasing certain types of positions or portfolios; sales of certain portfolios, securities, or other assets; improvements in risk modeling; or other changes in business focus or operations that would affect risk-weighted assets, leverage ratio assets, or capital. These include, but are not limited to, modeling for capital adequacy, market risk, counterparty risk, and other business risks.

Stress testing may also evaluate the processes used to manage and assess risks and capital adequacy on an ongoing and forward-looking basis. This assessment may be made by varying stress testing factors to determine when risks or capital are no longer adequate for a scenario.

Stress testing may be performed on a real-time or a periodic basis, and a periodic basis may change time periods. Additionally, or alternatively, stress testing may be performed whenever there may be a material change in the company's risk profile, business strategy, or corporate structure. Additionally, or alternatively, stress testing may be performed upon changes in economic and financial market conditions and relevant idiosyncratic risks, changes in the outlook for the operating environment, and to proactively adjust capital distributions as circumstances warrant.

Stress testing, such as CCAR testing, may include a comprehensive capital plan which may be submitted, and such a submission may be to, for example, the Federal Reserve.

The manner in which stress testing, such as CCAR testing, is conducted may also apply to stress testing of an asset or a portfolio. In some embodiments, the stress testing of an asset or a portfolio of assets may involve factors regarding the capital decisions the business associated with those asset may make in response to scenarios. Such stress testing, or the factors used in the stress testing, may, or may not, be used in optimizing a portfolio as described herein.

Stress testing may identify data gaps, which may be where data may not be available. In some embodiments, the stress testing may include receiving data from more than one source, such as from different divisions of a company or from third parties. A data gap may exist if the data received from each source is different, such as a one source omitting some of the data or some aspect of the data, including but not limited to the data being provided in a format that may contain less information. In some embodiments, data gaps may be when a scenario or model including data that has not been provided. In some embodiments, when stress testing identifies a data gap the stress test may be a trigger. In some embodiments, a trigger may alert that the data gap exists and proceed with the stress testing. In some embodiments, a trigger may request data not currently in the stress test be input to resolve the data gap. In some embodiments, the trigger may request data not currently in the stress test from a server or database, which may send requested data and, upon receipt, the stress test may incorporate the data to resolve the data gap.

Stress testing may identify data availability, including the availability of data at an appropriate level of granularity, such as a company level, a portfolio level, or an asset level. In some embodiments, if data is not available at the appropriate level of granularity, this may be identified as a data gap. In some embodiments, if data is not available at the appropriate level of granularity, the stress test may use data available at either a higher or lower level of granularity. In some embodiments, if data is not available at the appropriate level of granularity, the stress test may use assumptions, which may be based on data available at either a higher or lower level of granularity.

The stress testing factors evaluated by a stress test may change based on the test or the scenario tested. The stress testing factors evaluated in the stress test may also result in an algorithm or QC algorithm being selected for the stress test based on the algorithms performance or other factors. The factors may or may not be dependent on the scenario being tested, the reconciliation of risk data (e.g., the output of a stress test) with other financial data (e.g., financial data from a general ledger), data availability (including at what level or granularity data is available), data gaps, and/or if the data is sorted, unsorted, correlated, or uncorrelated.

In some embodiments, the stress testing may interact with authorities in a company, such as a supervisory authority that may supervise but not run the stress testing. The stress test may generate triggers associated with the supervising authority. In some embodiments, triggers may alert the supervising authority or request information from the supervising authority. In some embodiments, if a data gap is identified, the appropriate granularity of data is not available, a modelling choice is required, and/or an interpretive issue is identified (e.g., how to interpret a scenario, a model, and/or data), the stress test may generate a trigger that alerts and/or request the supervising authority to provide input related to the trigger.

In some embodiments, a stress test may have a threshold that may be required to indicate that the stress test was passed (e.g., greater than zero or greater than or equal to zero) or that the stress test was failed (e.g., less than zero). Based on if the stress test passes or fails, the stress test may generate a trigger. In some embodiments, such a trigger may cause the stress test to perform reverse stress testing to vary scenarios, models, factors, and/or algorithms to identify why a stress test failed. In one embodiment, the stress testing of a plurality of factors resulting in a failure of the stress test to return a value above a threshold may result in the stress test being rerun by varying each of the factors until the stress test is passed. In other embodiments, the stress test may be run in reverse without needing to pass or fail a first stress test, which may assist in identifying sensitivities or vulnerabilities to the scenarios, models, factors, or algorithms used in stress testing.

In some embodiments, the stress testing may be dynamic. Dynamic stress testing may be updated as scenarios, models, factors, or data availability change. These updates may be at specific time periods (e.g., hours, days, weeks, months, quarters, and/or years) and/or based on availability. In some embodiments, availability may be determined by the stress testing monitoring a, for example, data source and, upon a determination updated data is available, the stress testing will receive the updated data from the data source and incorporate the updated data into the stress testing to provide an updated result. In some embodiments, the stress testing may include multiple assumptions, such as a future performance of an asset, and the stress testing may be dynamic by, at the appropriate period in the future, updating the assumption with actual performance of the asset, which may or may not require updating a scenario, a model, a factor, or an algorithm, including but not limited to selecting a new scenario, model, factor, or algorithm. The updating of a dynamic model may or may not require alerting and approval from a supervisory authority.

In FIG. 7, as shown by operation 702, the apparatus 200 includes means, such as communications circuitry 208 and/or input-output circuitry 206 or the like, for receiving stress testing scenario data. The stress testing scenario data may include optimization factor data selected for a scenario, which may further include values, ranges, or thresholds for each of the selected optimization factor data.

As shown by operation 704, the apparatus 200 includes means, such as code identification circuitry 230 or the like, for identifying filtered stress testing factor data based on one or more of stress testing factor data, stress testing scenario data, QC algorithms, algorithm performance information, and code performance information. The filtering may filter the stress testing factor data and/or stress testing scenario data for data that will be used with or by a QC algorithm. Additionally, or alternatively, the filtering may filter the stress testing factor data and/or stress testing scenario data for data that will not be used with or by a QC algorithm.

The one or more QC algorithms may be one or more of, for example, Quadratic Unconstrained Binary Optimization "QUBO", Quantum Approximate Optimization Algorithm "QAOA", Quantum Machine Learning "QML", Quantum Geometrodynamics "QGD", Quantum Monte Carlo "QMC", Harrow, Hassidim and Lloyd "HHL", or the like, executed on a particular QC machine (e.g., quantum annealer, circuit-based quantum processor, or the like).

As shown by operation 706, the apparatus 200 includes means, such as algorithm selection circuitry 234 or the like, for selecting one or more QC algorithms for the filtered stress testing factor data for generating a stress testing determination. In some embodiments, the algorithm selection circuitry 234 may receive results of comparing the filtered stress testing factor data with performance of one or more QC algorithms and/or performance of code, and a QC algorithm will be selected accordingly.

As shown by operation 708, the apparatus 200 includes means, such as QC optimization circuitry 228, for utilizing the selected QC algorithm(s) to generate a stress testing determination from the filtered stress testing factor data which determines the results of the stress test, such as how a company being stress tested performed. A stress test determination, such as for CCAR, may provide what was determined regarding how a company performed in regards to: its current regulatory capital base; planned capital actions; processes and policies for determining the size of dividend and common stock repurchase programs under different operating conditions; potential losses, earnings, and other resources available to absorb losses; and an assessment of the capital needed to continue operations, meet its obligations, and function as a credit intermediary.

Additionally, or alternatively, a generation of a stress testing determination may also include the generation of information supporting the stress testing determination, including how a company was determined to have performed under stress testing scenarios, which may be a report.

Hurricane Graphics

Figure 8:
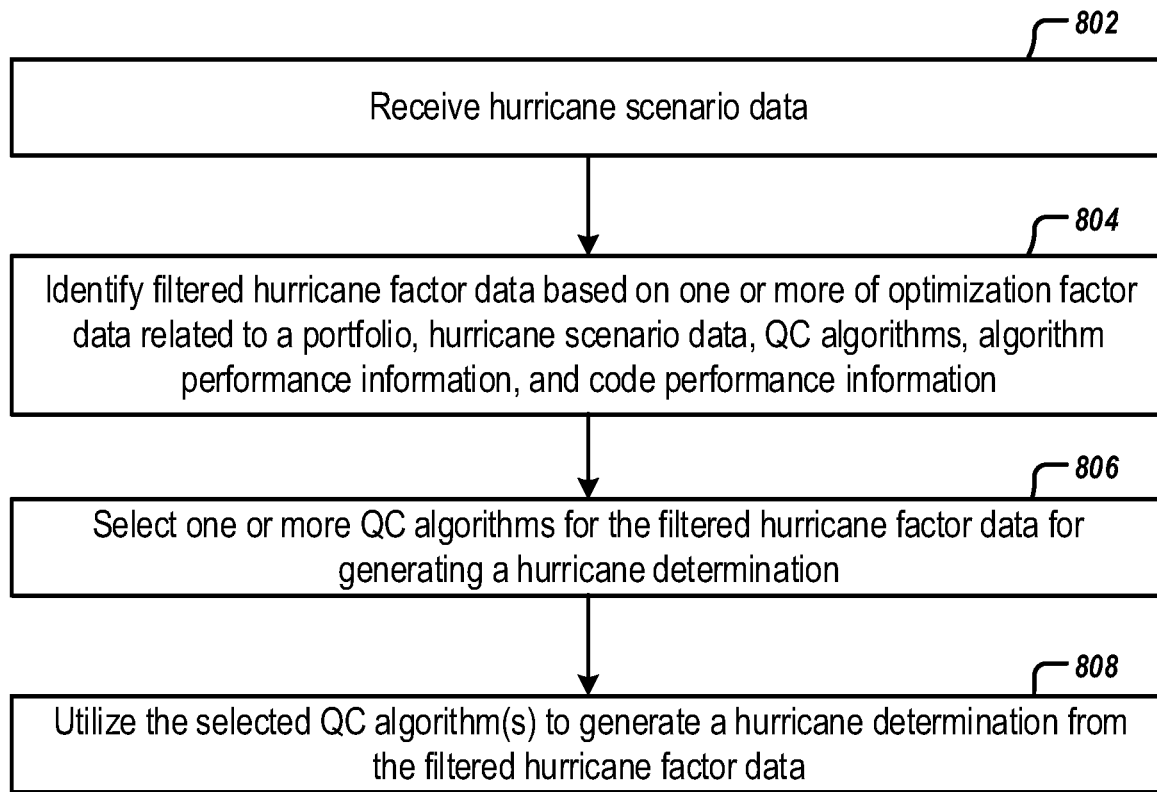
FIG. 8 illustrates an example flowchart for a hurricane determination based on QC algorithms in accordance with some example embodiments described herein.

FIG. 8 is a flowchart showing exemplary operations for performing a hurricane determination based on QC algorithms in accordance with some example embodiments described herein. A customer, who may or may not be the portfolio owner, may be presented with a graphical user interface presenting a plurality of information about a portfolio. The graphical user interface may include a hurricane GUI, which may provide multiple different outcomes related to the portfolio and also may allow the customer to choose one of the outcomes or provide feedback regarding the outcomes. The outcomes may be generated from optimizations, forecasts, and or stress testing, including how the portfolio may perform in various scenarios. The outcomes may be personalized to the customer, to the portfolio, or a portion of the portfolio.

The hurricane GUI may be based on a hurricane model. A hurricane model may provide a plurality of different risk tolerances (e.g., aggressive, conservative, etc.) and/or investment goals (e.g., growth, income, etc.). The hurricane model may, as described above, optimize, forecast, and/or stress test the portfolio according to the hurricane model.

The hurricane model may be applied to the portfolio using QC algorithms, which may be selected based on, among other things, data to be used in the hurricane model, algorithm performance information, and/or QC costs. A single QC algorithm may be used for the hurricane model, or a plurality of QC algorithms may be used. If a plurality of QC algorithms is used, a QC algorithm may be selected and used for distinct data in the hurricane model.

The hurricane GUI may display the results of the hurricane model to the customer, and it may provide insights and/or suggestions related to portfolio decisions that may be taken by a customer. The customer may choose one or more actions to be taken based on the hurricane GUI, and the action may be related to the entirety of the portfolio or to a portion of the portfolio. In an embodiment, the action that may be chosen may be to rebalance a portion or all of the portfolio, which may be related optimizing the portfolio for set of factors addressed in the hurricane model.

In one embodiment, a hurricane model may address a conservative risk level and anticipates a recession or a world event that negatively impacts the portfolio performance. The hurricane model may evaluate the customer's risk level in the scenario by forecasting how the scenario impacts, among other things, interest rates, stock prices, and bond prices. The model may filter the factors that be used to forecast interest rates, stock prices, and bond prices based on factors related to interest rates, stock prices, and bond prices and based on QC algorithms and QC algorithm performance. The filtering may include determining how the factors may change and if the factors may change. A QC algorithm may be selected for each of the filtered factors or, alternatively, a QC algorithm may be selected that addresses all of the filtered factors. The selected QC algorithms may then be used, and the output may be displayed in a hurricane GUI. A customer may then choose an action to take from the hurricane GUI.

In FIG. 8, as shown by operation 802, the apparatus 200 includes means, such as communications circuitry 208 and/or input-output circuitry 206 or the like, for receiving hurricane scenario data. The stress testing scenario data may include optimization factor data selected for a scenario, which may further include values, ranges, or thresholds for each of the selected optimization factor data.

As shown by operation 804, the apparatus 200 includes means, such as code identification circuitry 230 or the like, for identifying filtered hurricane factor data based on one or more of optimization factor data, hurricane scenario data, QC algorithms, algorithm performance information, and code performance information. The filtering may include filtering the optimization factor data and/or hurricane scenario data for data that will be used with or by a QC algorithm. Additionally, or alternatively, the filtering may include filtering the optimization factor data and/or hurricane scenario data for data that will not be used with or by a QC algorithm.

The one or more QC algorithms may be one or more of, for example, Quadratic Unconstrained Binary Optimization "QUBO", Quantum Approximate Optimization Algorithm "QAOA", Quantum Machine Learning "QML", Quantum Geometrodynamics "QGD", Quantum Monte Carlo "QMC", Harrow, Hassidim and Lloyd "HHL", or the like, executed on a particular QC machine (e.g., quantum annealer, circuit-based quantum processor, or the like).

As shown by operation 806, the apparatus 200 includes means, such as algorithm selection circuitry 234 or the like, for selecting one or more QC algorithms for the filtered hurricane factor data for generating a hurricane determination. In some embodiments, the algorithm selection circuitry 234 may receive results of comparing the filtered hurricane factor data with performance of one or more QC algorithms and/or performance of code, and a QC algorithm will be selected accordingly.

As shown by operation 808, the apparatus 200 includes means, such as QC optimization circuitry 228, for utilizing the selected QC algorithm(s) to generate a hurricane determination from the filtered hurricane factor data which determines, such as how a portfolio performed for a hurricane scenario. A hurricane determination may provide what was determined regarding how a portfolio performed and may be displayed via a hurricane GUI to a customer to present multiple difference outcomes related to a portfolio, which may allow a customer to choose one of the outcomes and/or provide feedback.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the QC system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A system for quantum computing (QC) based optimization of an efficient frontier determination, the system comprising:
    input-output circuitry configured to receive, over a network, an indication from a client device of a portfolio owner identifying a portfolio and a risk level associated with the portfolio;
    code identification circuitry configured to identify runtime hotspots associated with portfolio optimization factor data that would benefit from QC;
    QC optimization factor filtering circuitry configured to identify a plurality of filtered portfolio optimization factor data based on the risk level, the identified runtime hotspots, and one or more of a set of portfolio optimization factor data related to the portfolio, a set of QC algorithms, and algorithm performance information; and
    algorithm selection circuitry configured to:
        receive an identification of quantum computing hardware from QC optimization circuitry, and
        select, automatically, one QC algorithm from the set of QC algorithms for each filtered portfolio optimization factor data of the plurality of filtered portfolio optimization factor data, wherein the selection is based at least on the identification of the quantum computing hardware,
    wherein the QC optimization circuitry is further configured to utilize the selected QC algorithm to optimize the efficient frontier determination for each identified filtered portfolio optimization factor data.

2. The system of claim 1, further comprising processing circuitry configured to rebalance the portfolio based on the efficient frontier determination.

3. The system of claim 1, wherein the input-output circuitry is further configured to provide the portfolio owner with a rebalancing alert based on the efficient frontier determination.

4. The system of claim 3, further comprising processing circuitry configured to, after receiving input from the portfolio owner, rebalance the portfolio associated with the portfolio owner based on the efficient frontier determination.

5. The system of claim 1, wherein the algorithm selection circuitry is further configured to receive a catalog of QC algorithms and associated algorithm performance information.

6. The system of claim 1, wherein the portfolio optimization factor data comprises one or more of personal portfolio constraints data representing customer-defined constraints.

7. The system of claim 1, wherein the portfolio optimization factor data comprises one or more of personal portfolio factor data representing a customer-defined personal preference.

8. A method for quantum computing (QC) based optimization of an efficient frontier determination, the method comprising:
    receiving, over a network, an indication from a client device of a portfolio owner identifying a portfolio and a risk level associated with the portfolio;
    identifying runtime hotspots associated with portfolio optimization factor data that would benefit from QC;
    identifying a plurality of filtered portfolio optimization factor data based on the risk level the identified runtime hotspots, and one or more of a set of portfolio optimization factor data related to the portfolio, a set of QC algorithms, and algorithm performance information;
    receiving an identification of quantum computing hardware;
    selecting, automatically, one QC algorithm from the set of QC algorithms for each filtered portfolio optimization factor data of the plurality of filtered portfolio optimization factor data, wherein the selection is based at least on the identification of the quantum computing hardware; and
    utilizing the selected QC algorithm to optimize the efficient frontier determination for each identified filtered portfolio optimization factor data.

9. The method of claim 8, further comprising rebalancing the portfolio based on the efficient frontier determination.

10. The method of claim 8, further comprising providing the portfolio owner with a rebalancing alert based on the efficient frontier determination.

11. The method of claim 10, further comprising, after receiving input from the portfolio owner, rebalancing the portfolio associated with the portfolio owner based on the efficient frontier determination.

12. The method of claim 8, further comprising receiving a catalog of QC algorithms and associated algorithm performance information.

13. The method of claim 8, wherein the portfolio optimization factor data comprises at least one of (i) one or more of personal portfolio constraints data representing customer-defined constraints or (ii) one or more of personal portfolio factor data representing a customer-defined personal preference.

14. A computer program product for quantum computing (QC) based optimization of an efficient frontier determination, the computer program product comprising at least one non-transitory computer-readable storage medium storing program instructions that, when executed, cause a system to:
receive, over a network, an indication from a client device of a portfolio owner identifying a portfolio and a risk level associated with the portfolio;
identify runtime hotspots associated with portfolio optimization factor data that would benefit from QC;
identify a plurality of filtered portfolio optimization factor data based on the risk level the identified runtime hotspots, and one or more of a set of portfolio optimization factor data related to the portfolio, a set of QC algorithms, and algorithm performance information;
receive an identification of quantum computing hardware;
select, automatically, one QC algorithm from the set of QC algorithms for each filtered portfolio optimization factor data of the plurality of filtered portfolio optimization factor data, wherein the selection is based at least on the identification of the quantum computing hardware; and
utilize the selected QC algorithm to optimize the efficient frontier determination for each identified filtered portfolio optimization factor data.

15. The computer program product of claim 14, wherein the program instructions, when executed, further cause the system to rebalance the portfolio based on the efficient frontier determination.

16. The computer program product of claim 14, wherein the program instructions, when executed, further cause the system to provide the portfolio owner with a rebalancing alert based on the efficient frontier determination.

17. The computer program product of claim 14, wherein the program instructions, when executed, further cause the system, after receiving input from the portfolio owner, rebalance the portfolio associated with the portfolio owner based on the efficient frontier determination.

18. The computer program product of claim 14, wherein the program instructions, when executed, further cause the system to receive a catalog of QC algorithms and associated algorithm performance information.

19. The computer program product of claim 14, wherein the portfolio optimization factor data comprises one or more of personal portfolio constraints data representing customer-defined constraints.

20. The system of claim 1, wherein the input-output circuitry is further configured to, after optimization of the efficient frontier determination, generate user interface data, including an indication of the efficient frontier determination, for display on the client device of the portfolio owner.

* * * * *

UNITED STATES PATENT AND TRADEMARK OFFICE
CERTIFICATE OF CORRECTION

PATENT NO. : 11,620,710 B2
APPLICATION NO. : 16/887305
DATED : April 4, 2023
INVENTOR(S) : Ramanathan Ramanathan et al.

It is certified that error appears in the above-identified patent and that said Letters Patent is hereby corrected as shown below:

On the Title Page

Inventors item (72), the fourth inventor's name - Pierre Arbadjian - should read -- Pierre Arbajian --

Signed and Sealed this
Twenty-third Day of July, 2024

Katherine Kelly Vidal
*Director of the United States Patent and Trademark Office*